(12) United States Patent
Chin-Chung et al.

(10) Patent No.: US 12,355,135 B2
(45) Date of Patent: Jul. 8, 2025

(54) SYSTEM AND METHOD FOR REDUCING AN ANTENNA WINDOW SIZE AND ENHANCING A WIRELESS CHARGING EFFICIENCY AND PERFORMANCE

(71) Applicant: Dell Products, LP, Round Rock, TX (US)

(72) Inventors: Wu Chin-Chung, Yonghe District (TW); Ching Wei Chang, Cedar Park, TX (US)

(73) Assignee: DELL PRODUCTS LP, Round Rock, TX (US)

( * ) Notice: Subject to any disclaimer, the term of this patent is extended or adjusted under 35 U.S.C. 154(b) by 409 days.

(21) Appl. No.: 17/731,647

(22) Filed: Apr. 28, 2022

(65) Prior Publication Data

US 2023/0352808 A1    Nov. 2, 2023

(51) Int. Cl.
| | |
|---|---|
| *H01Q 1/22* | (2006.01) |
| *G06F 3/0354* | (2013.01) |
| *H01Q 1/24* | (2006.01) |
| *H04B 5/48* | (2024.01) |
| *H04B 5/79* | (2024.01) |

(52) U.S. Cl.
CPC ....... *H01Q 1/2266* (2013.01); *G06F 3/03545* (2013.01); *H01Q 1/243* (2013.01); *H04B 5/48* (2024.01); *H04B 5/79* (2024.01)

(58) Field of Classification Search
CPC .... H01Q 1/2266; H01Q 1/243; H01Q 1/2225; H01Q 1/40; H01Q 7/00; H01Q 1/22; H01Q 1/24; G06F 3/03545; H04B 5/48; H04B 5/79; H02J 7/02; H02J 50/10
See application file for complete search history.

(56) References Cited

U.S. PATENT DOCUMENTS

| | | | | |
|---|---|---|---|---|
| 5,945,981 | A | * | 8/1999 | Paull ................... G06F 3/03545 |
| | | | | 345/158 |
| 2006/0184705 | A1 | * | 8/2006 | Nakajima ........... H02J 7/00047 |
| | | | | 348/E5.042 |
| 2007/0179414 | A1 | * | 8/2007 | Imboden ................ A61H 19/00 |
| | | | | 601/72 |
| 2008/0186255 | A1 | * | 8/2008 | Cohen ................... G06F 3/0321 |
| | | | | 345/179 |
| 2008/0259030 | A1 | * | 10/2008 | Holtzman ........... G06F 3/03545 |
| | | | | 345/158 |
| 2008/0277259 | A1 | * | 11/2008 | Chang ................... G06F 3/0446 |
| | | | | 200/600 |

(Continued)

*Primary Examiner* — Hoang V Nguyen
(74) *Attorney, Agent, or Firm* — Prol Intellectual Property Law, PLLC; H. Kenneth Prol

(57) ABSTRACT

An information handling system with a wireless charging system or wireless antenna may include a processor; a memory; a power management unit (PMU), an antenna controller to provide instructions to a radio to cause an antenna to transceive wirelessly with a network, or a wireless charging controller to schedule the wireless charging at a charging coil, where the antenna or charging coil are part of a twice-molded modular antenna including: the antenna a charging coil, an antenna holder onto which the antenna is insert molded, and an antenna cover that is molded onto the antenna or charging coil for interference at an antenna window edge surface of a chassis cover of the information handling system.

20 Claims, 12 Drawing Sheets

(56) References Cited

U.S. PATENT DOCUMENTS

| | | | |
|---|---|---|---|
| 2009/0243944 A1* | 10/2009 | Jung | H01Q 1/243 343/702 |
| 2009/0261778 A1* | 10/2009 | Kook | H02J 50/10 320/108 |
| 2009/0284423 A1* | 11/2009 | Yi | H01Q 1/2283 343/702 |
| 2009/0315864 A1* | 12/2009 | Silverbrook | G06F 3/0321 345/179 |
| 2010/0186081 A1* | 7/2010 | Kawate | H01Q 1/243 705/41 |
| 2010/0194206 A1* | 8/2010 | Burdo | H02J 50/12 320/108 |
| 2010/0207575 A1* | 8/2010 | Pijnenburg | H04B 5/79 320/108 |
| 2010/0331050 A1* | 12/2010 | Tahk | H01R 13/2442 455/566 |
| 2011/0001673 A1* | 1/2011 | You | H01Q 1/243 343/702 |
| 2011/0151780 A1* | 6/2011 | Hood, III | H01Q 1/44 343/872 |
| 2012/0122519 A1* | 5/2012 | Jochheim | H04M 1/0202 455/556.1 |
| 2013/0076573 A1* | 3/2013 | Rappoport | H01Q 1/243 343/702 |
| 2013/0106725 A1* | 5/2013 | Bakken | G06F 3/04162 345/173 |
| 2014/0002014 A1* | 1/2014 | Sultenfuss | H02J 11/00 320/108 |
| 2014/0028635 A1* | 1/2014 | Krah | G06F 3/041 345/179 |
| 2014/0055427 A1* | 2/2014 | Kim | G06F 3/0488 345/179 |
| 2014/0347233 A1* | 11/2014 | Mahanfar | H01Q 1/521 343/720 |
| 2017/0063130 A1* | 3/2017 | Sultenfuss | H02J 50/12 |
| 2017/0090603 A1* | 3/2017 | Cho | G06F 3/0482 |
| 2017/0192458 A1* | 7/2017 | McClure | G06F 3/0412 |
| 2017/0201119 A1* | 7/2017 | Sultenfuss | G06F 1/263 |
| 2017/0351397 A1* | 12/2017 | Won | G06F 3/046 |
| 2019/0237865 A1* | 8/2019 | Ramasamy | H01Q 1/2266 |
| 2021/0167487 A1* | 6/2021 | Varma | H01Q 1/243 |
| 2021/0175610 A1* | 6/2021 | Ramasamy | H01Q 1/2266 |
| 2022/0101992 A1* | 3/2022 | Porter | A61B 5/6833 |
| 2022/0102869 A1* | 3/2022 | Park | H04M 1/02 |

* cited by examiner

SYSTEM AND METHOD FOR REDUCING AN ANTENNA WINDOW SIZE AND ENHANCING A WIRELESS CHARGING EFFICIENCY AND PERFORMANCE

FIELD OF THE DISCLOSURE

The present disclosure generally relates to a wireless charging and communication device of, for example, an information handling system. The present disclosure more specifically relates to the placement and integration of a wireless charging or communication device in a housing of an information handling system.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may include a peripheral device such as a stylus having its own battery that may be charged wirelessly using a wireless charging system of the information handling system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
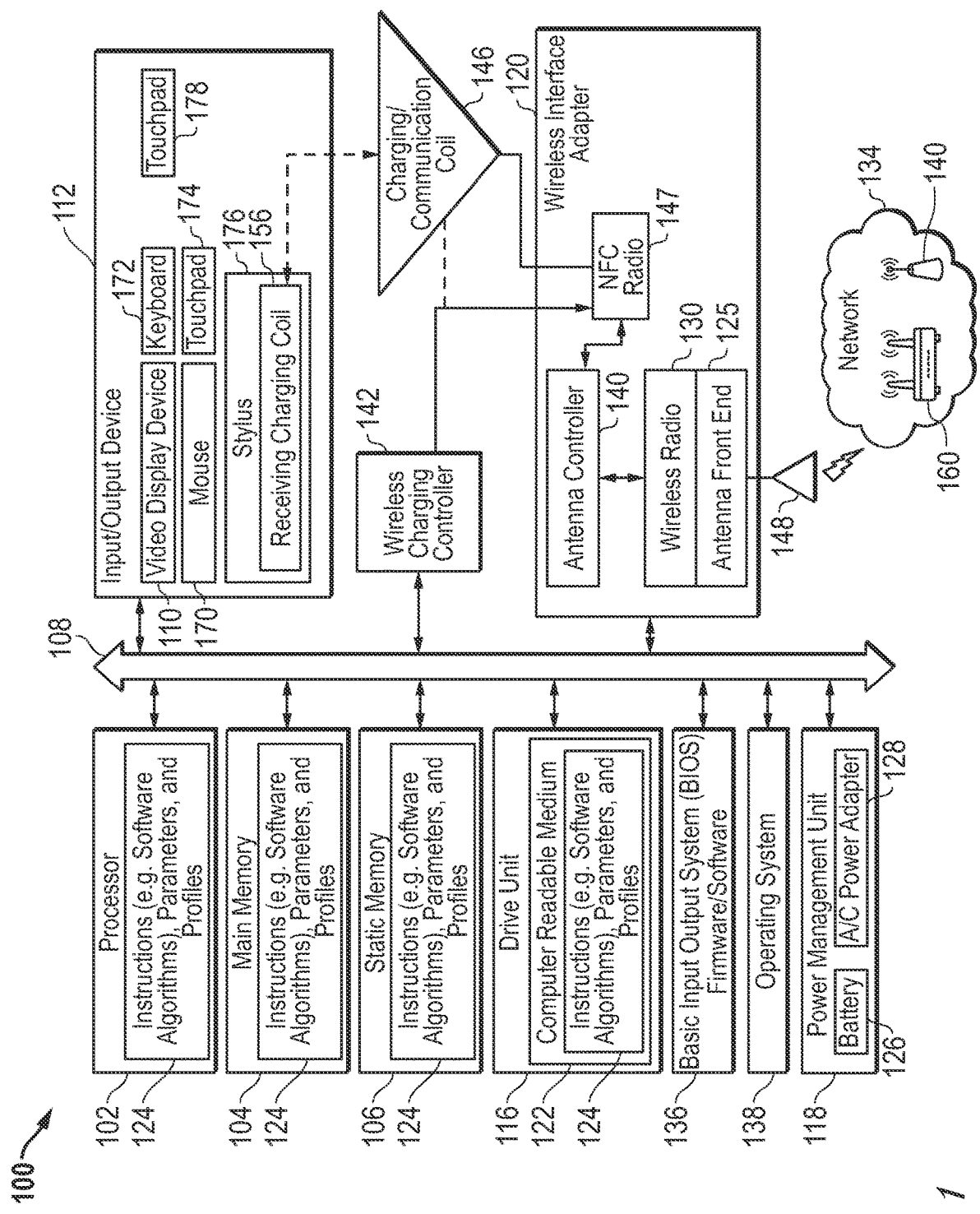
FIG. 1 is a block diagram illustrating an information handling system with a wireless charging and communication system according to an embodiment of the present disclosure.

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Embodiments of the present disclosure provide for a system and method to charge a wireless peripheral device or communicate wirelessly via an information handling system. In an embodiment, the information handling system includes a processor, a memory, and a power management unit (PMU). In an embodiment, the information handling system further includes an antenna controller to provide instructions to a radio to cause an antenna to transceive wirelessly with a network. The transceiving antenna, in an embodiment, may be part of a twice-molded modular antenna that includes the antenna as well as an antenna holder onto which the antenna is insert molded onto and an antenna cover that is molded onto the antenna and molded into a chassis cover. In another embodiment, the transceiving antenna is part of a twice molded modular antenna that includes the antenna holder being insert molded onto the antenna and the antenna cover insert molded onto on opposite side of the modular antenna. In this embodiment, the antenna holder, antenna, and antenna cover may be press fit into a window formed into the metal chassis of the information handling system. In an embodiment, this transceiving antenna may include interference joints used to mate with a joint formed into a chassis of an information handling system. The twice-molding of the antenna holder and the transceiving antenna molded into a chassis cover may allow for the antenna to be placed closer to an outward edge of a chassis of an information handling system. This allows for better transmission and reception of signals at additional angles or smaller antenna window in the chassis cover. Indeed, because the chassis of the information handling system is made of metal, this metal chassis creates less of an interference effect on the transception by the antenna located closer to the surface of the chassis cover.

In an embodiment, the information handling system includes a wireless charging system. In an embodiment, this wireless charging system includes a wireless charging controller to schedule or otherwise control the wireless charging at, for example, a near field communication (NFC) antenna or charging coil. In an embodiment, the NFC antenna may be used to both communicate with devices as well as charge wireless peripheral devices. In an embodiment, the NFC antenna is also subjected to a twice-molding process. This twice-molded modular antenna (e.g., having an NFC antenna therein) includes, in an embodiment, a charging coil, an antenna holder onto which the antenna is insert molded onto, and the antenna holder and antenna is molded into a chassis cover at an antenna window. In an embodiment, the antenna cover is formed with interference joints used to mate with a joint formed into a chassis of the information handling system.

In an embodiment, the antenna cover formed into a chassis cover at an antenna window is made of a radio frequency transparent (RF) material. In an embodiment, the antenna cover is made of a RF material to matches a color or texture of a metallic chassis of the information handling system. In an embodiment, the antenna holder is made of plastic. In an embodiment, during manufacture, the antenna holder is insert molded onto the antenna or visa-versa to secure the antenna onto the surface of the antenna holder. It is appreciated that the antenna holder may be affixed to the antenna using any method with the insert molding process be used for better accuracy in fitting the antenna holder to the antenna. In an embodiment, the plastic antenna cover is insert molded onto the antenna along with the antenna holder in and into a chassis cover at an antenna window and a dual injection molding process. In an embodiment, the plastic antenna cover is insert molded onto the antenna in a first insert molding operation while the antenna holder is insert molded onto the antenna on a second insert molding process. This process may form a twice-molded modular antenna with the antenna cover and antenna holder that is modularly formed into or inserted and coupled to the chassis of the information handling system using, for example, interference fitting surfaces between the twice-molded modular antenna and the chassis of the information handling system. In another example embodiment, the plastic antenna holder is insert molded onto the antenna in a first insert molding operation. In a second insert molding process in this example embodiment, the antenna holder and antenna are insert molded into the antenna cover as the antenna cover is insert molded into a window formed in a metallic chassis of the information handling system.

In an embodiment, the wirelessly rechargeable peripheral device may include a stylus, a keyboard, a mouse, or the like. The wirelessly rechargeable peripheral device may include a receiving charging coil that receives power via the charging coil (e.g., NFC antenna) upon execution of computer code by the processor or the wireless charging controller. In an embodiment, a printed circuit board (PCB) may be operatively coupled to the antenna (e.g., charging coil) with the PCB including an antenna front end, RF module, wireless radio, and/or antenna controller. In an embodiment, this PCB may be embedded in the antenna holder or physically associated with the twice-molded modular antenna as described herein. In an embodiment, the PCB may be separate from the twice-molded modular antenna but operatively coupled to the twice-molded modular antenna. With the twice molded antenna at the edge of the information handling system or formed at the side of the stylus, the transmission and reception charging coils may be disposed closer to one another to improve efficiency of wireless charging of the stylus along the information handling system.

Turning now to the figures, FIG. 1 illustrates an information handling system 100 similar to information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP) 160, a base station transceiver 162, a wireless telephone, a control system, a camera, a scanner, a printer, a pager, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions. In an embodiment, a collection of systems or subsystems may include a client device interfacing, via a network, with processing resources at, for example, a server to execute computer code to perform one or more computer functions described herein.

The information handling system may include memory (volatile (e.g., random-access memory, etc.), nonvolatile (read-only memory, flash memory etc.) or any combination thereof), one or more processing resources, such as a central processing unit (CPU), a graphics processing unit (GPU), an accelerated processing unit (APU), an arithmetic logic unit (ALU), a control unit (CU), a reduced instruction set computer (RISC), a network processing unit (NPU), a video processing unit (VPU), an application specific integrated circuit (ASIC), a field-programmable gate array (FPGA), processors, controllers, or other processing hardware. In an embodiment, software or firmware code instructions 124 may be executed by a processing device described herein. Additional components of the information handling system 100 may include one or more storage devices, one or more communications ports for communicating with external devices, as well as various input and output (I/O) devices 112, such as a keyboard 172, a touchpad 178, a mouse 170, a headset 174, a stylus 176, a video/graphic display 110, or any combination thereof. Portions of an information handling system 100 may themselves be considered information handling systems 100.

Information handling system 100 may include devices or modules that embody one or more of the devices or execute instructions for the one or more systems and modules described herein, and operates to perform one or more of the methods described herein. The information handling system 100 may execute code instructions 124 (e.g., via a processing device) that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), or some combination of the same. Any of the processing resources may operate to execute code that is either firmware or software code. Moreover, the information handling system 100 may include memory such as main memory 104, static memory 106, or other memory of computer readable medium 122 storing instructions 124 executable by the antenna controller 140, wireless charging controller 142, or any other processing device, and drive unit 116 (volatile (e.g., random-access memory, etc.), nonvolatile memory (read-only memory, flash memory etc.) or any combination thereof. The information handling system 100 may also include one or more buses 108 operable to transmit communications between the various hardware components such as any combination of various input and output (I/O) devices described herein.

The information handling system 100 may further include a video display device 110. The video display device 110 in an embodiment may function as a liquid crystal display (LCD), an organic light emitting diode (OLED), a flat panel display, or a solid-state display. Additionally, the information handling system 100 may include an input/output device 112 that allows the user to interface with the information handling system 100 via the video display device 110, such as a cursor control device (e.g., a mouse 170, a touchpad 178, or gesture or touch screen input), and a keyboard 172, or stylus 176, among others. Various drivers and control electronics may be operatively coupled to operate a wireless charging device that includes a charging/communication coil 146 which may interact with a receiving charging coil within any wireless input/output devices 112 (e.g., the stylus 176, mouse 170, keyboard 172, etc.) described herein.

The network interface device in FIG. 1 is shown as wireless interface adapter 120 but may also be a wired network interface device as is understood in the art and may provide connectivity to a network 134, e.g., a wide area network (WAN), a local area network (LAN), wireless local area network (WLAN), a wireless personal area network (WPAN), a wireless wide area network (WWAN), or other network. The wireless interface adapter 120 may provide connectivity to a network 134 including one or more access points 160 or base stations 162 via operation of any type of wireless radio such as a WLAN radio and WLAN antenna front end and/or a WWAN radio and WWAN antenna front end being controlled by an antenna controller 140. It is appreciated that any number of radios (e.g., wireless radio 130 and near field communication (NFC) radio 147) and RF front ends may be associated with a plurality of antennas within the information handling system and may operate under any wireless protocol described herein. Connectivity may be via wired or wireless connection. The wireless interface adapter 120 may operate in accordance with any wireless data communication standards. To communicate with a wireless local area network, standards including IEEE 802.11 a/h/j/n/ac/ax WLAN standards, IEEE 802.15 WPAN standards, WWAN such as 3GPP or 3GPP2, or similar wireless standards may be used. In some aspects of the present disclosure, one wireless interface adapter 120 may operate two or more wireless links. Information handling systems including those that are mobile in embodiments of the present disclosure may employ a plurality of antenna systems for communication via wireless links operating on a variety of radio access technologies (RAT). For example, a mobile information handling system in an embodiment of the present disclosure may employ separate antenna systems for Wi-Fi signals, wireless wide area network (WWAN) signals, Bluetooth signals, and wireless local area network (WLAN) signals. WWAN signals in embodiments of the present disclosure may include 2G standards such as GSM, 2.5G standards such as GSM EDGE and GPRS, 3G standards such as W-CDMA/UMTS and CDMA 2000, 4G standards such as LTE, LTE-A, LTE-LAA, emerging 5G standards, or WiMAX, small cell WWAN, and the like. Wi-Fi and WLAN signals in embodiments of the present disclosure may include wireless links adhering to standards such as, for example, IEEE 802.11 WiFi, IEEE 802.11ad WiGig, IEEE 802.15 WPAN, and IEEE 802.11ax-2021 (e.g., WiFi 6 and 6E, 6 GHz technologies). In other aspects, several antenna systems may be available for each RAT to enable aggregated data communications such as via plural multiple in, multiple out (MIMO) streams (e.g., Wi-Fi MIMO or cellular MIMO) to enhance data bandwidth or reliability. In some examples, an information handling system may support multi-RAT radios (4G, 5G, WLAN) that require simultaneous transmission using multiple antennas to support various modes of transmission (e.g., uplink (UL) MIMO and 5G E-UTRAN new radio (EN-DC)). With 5G technology, these information handling systems may use 4×4 sub-6 GHz antennas and 2×2 mmWave antennas, while WLAN supports 2×2 antennas, in some embodiments. Other configurations, arrangements, and numbers of antenna may be used to provide transception of data to and from the information handling system 100 and those devices on, for example, the network 134.

It is appreciated that the twice-molded modular antenna described herein may be any type of antenna operating under any of these wireless protocols with the twice-molded modular antenna. For example the twice-molded antenna may be used for near-field communication (NFC) and, as such, an NFC antenna (e.g., including charging/communication coil 146) may form the antenna and may be operatively and wirelessly coupled to a receiving charging coil 156 housed within a wireless peripheral device (e.g., stylus 176, mouse 170, keyboard, 172, etc.). In an embodiment, a plurality of twice-molded modular antennas (e.g., 148) may be used to support a plurality of different data transceiving antennas (Wi-Fi transception, WLAN transception, WWAN transception, among others) providing a modular antenna that places the antenna at a location closer to an edge surface of the chassis of the information handling system 100 thereby increasing the transmission and reception capabilities of the antennas of the twice-molded modular antennas reducing antenna window size. With reference to the present specification, the term "antenna" (e.g., 146, 148) may refer to any type of device that transmits electromagnetic radiation for any purpose. Example antennas may include a monopole antenna, a dipole antenna, a printed circuit board (PCB) antenna, a printed inverted-F antenna (PIFA), an antenna array, a directional antenna, among other types. These antenna types may be used as Wi-Fi antennas, WWAN antennas, or WLAN antennas, among other wireless protocols. Therefore, an NFC antenna (e.g., charging/communication coil 146) may be referred to as an antenna because it may transmit data as well as create an electromagnetic inductive field used to charge a battery, for example. In this example embodiment, the charging/communication coil 146 may include a coil of wire used to create the inductive field used to transmit power from the information handling system 100 to a receiving charging coil 156. Still further the term "antenna" (e.g., 146, 148) may also refer to those types of antenna that transceive data via the network (e.g., antenna 148).

Wireless interface adapter 120 may connect to any combination of macro-cellular wireless connections including 2G, 2.5G, 3G, 4G, 5G or the like from one or more service providers or privately administered network providers via the twice-molded modular antennas and associated systems (e.g., wireless radio 130 and NFC radio 147). Wireless interface adapter 120 may also connect to any WLAN networks such as Wi-Fi networks. Utilization of radiofrequency communication bands according to several example embodiments of the present disclosure may include bands used with the WLAN standards and WWAN carriers, which may operate in both licensed and unlicensed spectrums.

In some embodiments, software executed by a processing device, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit (ASIC). Accordingly, the present system encompasses software, firmware, and hardware implementations.

In accordance with various embodiments of the present disclosure, the methods described herein may be implemented by firmware or software programs executable by a controller or a processor system (e.g., processor 102). Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 124 or receives and executes instructions, parameters, and profiles 124 responsive to a propagated signal, so that a device connected to a network 134 may communicate voice, video or data over the network 134. Further, the instructions 124 may be transmitted or received over the network 134 via the network interface device or wireless interface adapter 120.

The information handling system 100 may include a set of instructions 124 that may be executed to cause the information handling system 100 to perform any one or more of the methods or computer-based functions disclosed herein. For example, instructions 124 may be executed by an antenna controller 140 and wireless charging controller 142, and may include software agents, or other aspects or components used to execute the methods and systems described herein. Various software modules comprising application instructions 124 may be coordinated by an operating system (OS), and/or via an application programming interface (API). An example operating system may include Windows®, Android®, and other OS types. Example APIs may include Win 32, Core Java API, or Android APIs. Additionally, execution of the instructions described herein may be via execution of firmware by the antenna controller 140 and/or wireless charging controller 142.

The disk drive unit 116 may include a computer-readable medium 122 in which one or more sets of instructions 124 such as software may be embedded and executed by the antenna controller 140 and/or wireless charging controller 142, in an embodiment. Similarly, main memory 104 and static memory 106 may also contain a computer-readable medium for storage of one or more sets of instructions, parameters, or profiles 124 including wireless charging instructions that allow for a user to initiate a wireless charging process via the wireless charging controller 142, the NFC radio 147, and charging/communication coil 146 as described herein. The disk drive unit 116 and static memory 106 may also contain space for data storage. Further, the instructions 124 may embody one or more of the methods or logic as described herein. For example, instructions relating to and executed by the wireless charging controller 142, software algorithms, processes, and/or methods may be stored here. In a particular embodiment, the instructions, parameters, and profiles 124 may reside completely, or at least partially, within the main memory 104, the static memory 106, and/or within the disk drive 116 during execution by the processor 102 of information handling system 100. As explained, some or all of the instructions 124 to be executed by a processor 102 for software applications, the antenna controller 140, or the wireless charging scheduling controller 142 may be executed locally, remotely, or a combination thereof. The main memory 104 and the processor 102 also may include computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The computer executable instructions 124 to be executed by the wireless charging controller 142 and antenna controller 140 may be stored in static memory 106, or the drive unit 116 on a computer-readable medium 122 such as a flash memory or magnetic disk in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

As described herein, the information handling system 100 includes a wireless charging controller 142. The wireless charging controller 142 may, in an embodiment, be part of the processor 102, a microcontroller unit (MCU), an embedded controller (EC), or another individual processing device used to coordinate with the antenna controller 140 and power management unit (PMU) 118 to selectively charge the power storage devices (e.g., rechargeable battery) within the peripheral devices associated with the information handling system 100 via operative interactions between the charging/communication coil 146 in the information handling system 100 and receiving charging coil 156 in the peripheral device (e.g., stylus 176). In an embodiment, the wireless charging controller 142 may receive input from one or more sensors, including the charging/communication coil 146 indicating the presence of the receiving charging coil 156 of the peripheral device such as the stylus 176. This input may be used to indicate to the wireless charging controller 142 when to initiate a charging process. In an embodiment, the processing device may control wireless charging of an input/output device 112 such as the stylus 176, a keyboard 172, a mouse 170, a headset 174, and the like. During operation of the information handling system 100, the wireless charging controller 142 in coordination with the PMU 118 may direct the NFC radio 147 to conduct wireless charging processes. In an embodiment, the antenna controller 140 may interface with the wireless radio 130 to engage in data transception via the network 134.

As described herein the charging/communication coil 146 and/or the antenna 148 may each be incorporated into a twice-molded modular antenna that causes the charging/communication coil 146 and/or antenna 148 to be placed closer to an outer surface of the chassis of the information handling system 100. In the embodiments where the charging/communication coil 146 within the twice-molded modular antenna is placed closer to the outer surface of the chassis than would a similar charging/communication coil 146 would be placed, the inductive field may more effectively reach the receiving charging coil 156 within the peripheral device due to closer proximity between a transmission charging/communication coil 146 and the receiving charging coil 156. This is in contrast to other types of charging/communication coils that are, for example, behind a dedicated window formed into the housing of the chassis of the information handling system 100. Also, because the charging/communication coil 146 is placed relatively closer to the outer surface of the chassis, the size of the charging/communication coil 146 may be reduced while still allowing for an increase in the ability of the charging/communication coil 146 to wirelessly charge and communication with external devices. Additionally, because the twice-molded modular antenna is modular, production of the chassis of the information handling system 100 may include customized locations where the module may be formed via a second step in an injection molding process or via an interference fit into the chassis.

As described herein, the stylus 176, for example, may include a receiving (RX) charging coil 156. This RX charging coil 156 receives a fluctuating magnetic field emitted from the charging/communication coil 146 operatively coupled to the NFC radio 147 at the information handling system 100. This fluctuating magnetic field is received at the RX charging coil 156 and converted into an alternating current (AC). In an embodiment, the AC may be converted into direct current (DC) via a rectifier and used to either power the stylus 176 or charge a power storage device (e.g., a battery) in the stylus 176. This process of charging is initiated and controlled via operation of the wireless charging controller 142 as described. It is appreciated that, although FIG. 1 shows the stylus 176 includes a RX charging coil 156, other peripheral devices may also include a similar RX charging coils 156 that interface in a similar way with the charging/communication coil 146 of the NFC radio 147 as described. In the present description, the stylus 176 is used as an example peripheral device for ease of understanding and description. Therefore, in other embodiments, any of the keyboard 172, the mouse 170, the headset 174, or other types of peripheral devices (e.g., any input/output device 112) may include a RX charging coils 156 used to interface with the charging/communication coil 146 of the NFC radio 147 as described herein.

In an embodiment, the charging/communication coil 146 or antenna 148 may be made of a flexible substrate such as a flexible printed circuit board (FPCB). In an embodiment, the charging/communication coil 146 may include a charging coil embedded into or formed on the FPCB that is operatively coupled to the NFC radio 147. The charging coil, in this embodiment, may be used to transmit the fluctuating magnetic field used in this inductive charging process. As described herein, the NFC coil formed on the FPCB may, in some example embodiments, be used to both transceive data as well as transmit the fluctuating magnetic field for inductive charging. In the embodiments where the charging/communication coil 146 is switched out for an antenna (e.g., antenna 148), the antenna may also be embedded into a similar FPCB. In another embodiment, the antenna 148 may be a metal antenna structure used to transceive data via the excitation of an edge of the metal piece.

In example embodiments, dedicated hardware implementations such as ASICs, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein is configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module may include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module may also include a combination of the foregoing examples of hardware or software. In an embodiment an information handling system 100 may include an integrated circuit or a board-level product having portions thereof that may also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another may communicate directly or indirectly through one or more intermediaries.

As described herein, the information handling system 100 may further include a power management unit (PMU) 118 (a.k.a. a power supply unit (PSU)). The PMU 118 may manage the power provided to the components of the information handling system 100 such as the processor 102, a cooling system, one or more drive units 116, a graphical processing unit (GPU), a video/graphic display device 110 or charging other input/output devices 112 via wired charging or wireless charging controller 142 such as for the stylus 176, and other components that may require power when a power button has been actuated by a user. In an embodiment, the PMU 118 may monitor power levels and be electrically coupled, either wired or wirelessly, to the information handling system 100 to provide this power or be coupled to bus 108 to provide or receive data or instructions. The PMU 118 may be coupled to the wireless charging controller 142 to control charging functions of the information handling system 100 as described herein. The PMU 118 may regulate power from a power source such as a battery 126 or A/C power adapter 128. In an embodiment, the battery 126 may be charged via the A/C power adapter 128 and provide power to the components of the information handling system 100 via a charging/communication coil 146, wired connections as applicable, or when A/C power from the A/C power adapter 128 is removed.

The information handling system 100 may include one or more of an operating system (OS) 138, and basic input/output system (BIOS) firmware/software 136 or application programs that may be executable instructions 124 executed at any processor 102 and stored at one or more memory devices 104, 106, or 116. BIOS firmware/software 136 functions to initialize the information handling system 100 on power up, to launch an OS 138, and to manage input and output interactions between the OS 138 and the other elements of information handling system 100. In a particular embodiment, BIOS firmware/software 136 resides in memory 104, and include machine-executable code that is executed by processor 102 to perform various functions of information handling system 100 as described herein. In another embodiment (not illustrated), application programs and BIOS firmware/software 136 reside in another storage medium of the information handling system 100. For example, application programs and BIOS firmware/software 136 can reside in drive 116, in a ROM (not illustrated) associated with the information handling system 100, in an option-ROM (not illustrated) associated with various devices of the information handling system 100, in a storage system (not illustrated) associated with network channel of a wireless interface adapter 120, in another storage medium of the information handling system 100, or a combination thereof. Executable code instructions 124 for application programs and BIOS firmware/software 136 can each be implemented as single programs, or as separate programs carrying out the various features as described herein.

Figure 2:
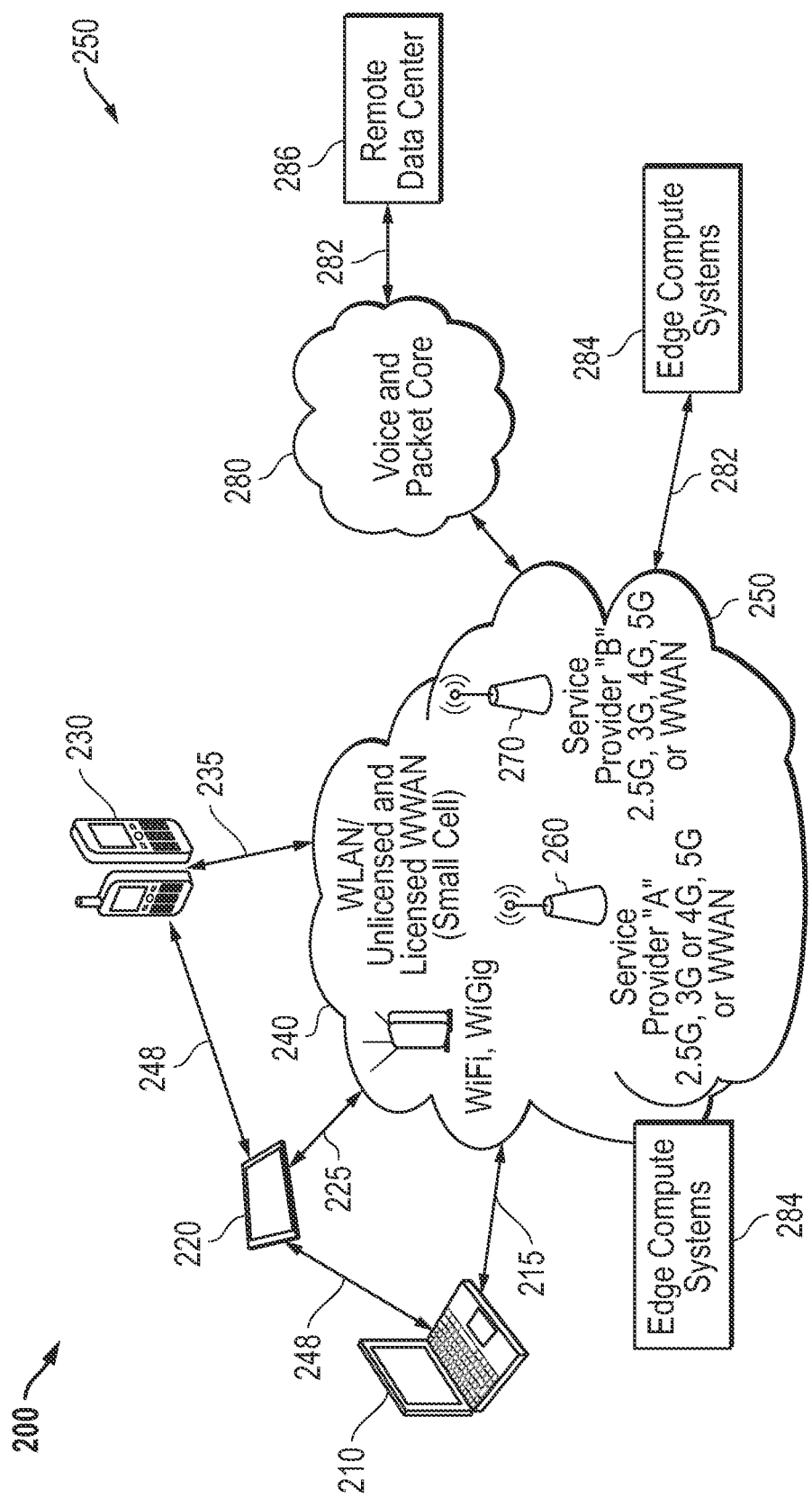
FIG. 2 is a block diagram of a network environment offering several communication protocol options and mobile information handling systems according to an embodiment of the present disclosure.

FIG. 2 illustrates a network 200 that can include one or more endpoint devices 210, 220, 230. The endpoint devices 210, 220, 230 shown in FIG. 2 may be similar to the information handling system 100 described in connection with FIG. 1. In a particular embodiment, network 200 includes networked mobile endpoint devices 210, 220, 230, wireless network access points, and multiple wireless connection link options. A variety of additional computing resources of network 200 may include client mobile information handling systems, data processing servers, network storage devices, local and wide area networks, a RAN service provider, or other resources as needed or desired. As partially depicted, endpoint devices 210, 220, 230 may be a laptop computer, tablet computer, 360-degree convertible systems, wearable computing devices, or a smart phone device. These mobile endpoint devices 210, 220, 230, may access a wireless local network 240, or they may access a macro-cellular network 250. For example, the wireless local network 240 may be the wireless local area network (WLAN), a wireless personal area network (WPAN), or a wireless wide area network (WWAN). In an example embodiment, LTE-LAA WWAN may operate with a small-cell WWAN wireless access point option. In an embodiment, these networks may provide cloud computing resources for the individual mobile endpoint devices 210, 220, 230.

Since WPAN or Wi-Fi Direct connection 248 and WWAN networks can functionally operate similar to WLANs, they may be considered as wireless local area networks (WLANs) for purposes herein. Components of a WLAN may be connected by wireline or Ethernet connections to a wider external network such as a voice and packet core 280. For example, wireless network access points or base stations may be connected to a wireless network controller and an Ethernet switch. Wireless communications across wireless local network 240 may be via standard protocols such as IEEE 802.11 Wi-Fi, IEEE 802.11ad WiGig, IEEE 802.15 WPAN, IEEE 802.11ax-2021, (e.g., Wi-Fi 6 and 6E, 6 GHz technologies), or 5G small cell WWAN communications such as gNodeB, eNodeB, or similar and future wireless network protocols and access points. Alternatively, other available wireless links within network 240 may include macro-cellular connections 250 via one or more service providers 260 and 270. The organization of a number of endpoint devices 210, 220, 230 may be defined by the endpoint devices 210, 220, 230 accessing a specific or number of specific base stations. In an embodiment, the endpoint devices 210, 220, 230 may be operatively coupled to any of the macro-cellular connections 250 via one or more service providers 260 and 270 or to the wireless local area networks (WLANs) selectively. Service provider macro-cellular connections may include 2G standards such as GSM, 2.5G standards such as GSM EDGE and GPRS, 3G standards such as W-CDMA/UMTS and CDMA 2000, 4G standards, or emerging 5G standards including WiMAX, LTE, and LTE Advanced, LTE-LAA, small cell WWAN, 3GPP protocols, and the like.

Wireless local network 240 and macro-cellular network 250 may include a variety of licensed, unlicensed or shared communication frequency bands as well as a variety of wireless protocol technologies ranging from those operating in macrocells, small cells, picocells, or femtocells. In accordance with several embodiments of the present disclosure, utilization of RF communication bands may include bands used with the WLAN standards and WWAN carriers which may operate in both licensed and unlicensed spectrums. For example, both WLAN and WWAN may use the Unlicensed National Information Infrastructure (U-NII) band which typically operates in the ~5 MHz frequency band such as 802.11 a/h/j/n/ac/ax (e.g., center frequencies between 5.170-7.125 GHz). WLAN, for example, may operate at a 2.4 GHz band, 5 GHz band, and/or a 6 GHz band according to, for example, Wi-Fi, Wi-Fi 6, or Wi-Fi 6E standards. WWAN may operate in a number of bands, some of which are proprietary but may include a wireless communication frequency band. For example, low-band 5G may operate at frequencies similar to 4G standards at 600-850 MHz or, in an embodiment, 960 Mhz. Mid-band 5G may operate at frequencies in an FR1 range between 1.8 and 6 GHz. Additionally, high-band 5G frequencies may operate at 25 to 39 GHz and even higher. In additional examples, WWAN carrier licensed bands may operate at the new radio frequency range 1 (NRFR1), NRFR2, bands, and other known bands as described herein per the operation of the 5G protocol standards for a 5G radio module. Each of these frequencies used to communicate over the network 240 may be based on the radio access network (RAN) standards that implement, for example, eNodeB or gNodeB hardware connected to mobile phone networks (e.g., cellular networks) used to communicate with the endpoint devices 210, 220, 230. In the example embodiment, mobile endpoint devices 210, 220, 230 may also include both unlicensed wireless RF communication capabilities as well as licensed wireless RF communication capabilities. For example, licensed wireless RF communication capabilities may be available via a subscriber carrier wireless service operating the cellular networks. With the licensed wireless RF communication capability, an WWAN RF front end of the endpoint devices 210, 220, 230 may operate on a licensed WWAN wireless radio with authorization for subscriber access to a wireless service provider on a carrier licensed frequency band. WLAN such as Wi-Fi (e.g., Wi-Fi 6) may be unlicensed.

In some embodiments according to the present disclosure, a networked mobile endpoint device 210, 220, 230 may each have a plurality of wireless network interface systems or radio protocol subsystems capable of transmitting simultaneously within several communication bands or even utilizing a shared communication frequency band access to multiple protocols. In an embodiment, one or more of these wireless network interface systems or radio protocol subsystems may include the twice-molded modular antenna described herein that provides a shorter distance from the antenna to an outside surface of chassis of the networked mobile endpoint device 210, 220, 230. Communication within a shared communication frequency band may be sourced from different protocols on parallel wireless network interface systems or from a single wireless network interface system capable of transmitting and receiving from multiple protocols. Similarly, a single antenna or the plurality of antennas in each endpoint device 210, 220, 230 may be used on each of the wireless communication devices such as according to embodiments herein and may be suited to plural RF bands. As described herein, each of the endpoint devices 210, 220, 230 may include a 5G antenna that are capable of transmitting and receiving data using an FR1 and FR2 frequency concurrently to communicate with multiple networks. Example competing protocols may be local wireless network access protocols such as Wi-Fi/WLAN, WiGig, and small cell WWAN in an unlicensed, shared communication frequency band. Within local portion of wireless network 250 access points for Wi-Fi as well as small cell WWAN connectivity may be available in 5G technology or emerging 6G technology. This may create situations where a plurality of antenna systems are operating on an endpoint device 210, 220, 230 via concurrent communication wireless links on both WLAN and WWAN radios and antenna systems. In some embodiments, concurrent wireless links may operate within the same, adjacent, or otherwise interfering communication frequency bands. The antenna may be a transmitting antenna that includes high-band, medium-band, low-band, and unlicensed band transmitting antennas in embodiments herein. The antenna may cooperate with other antennas in a NxN MIMO (where "N" is any number) array configuration according to the embodiments described herein. Alternatively, embodiments may include a single transceiving antenna capable of receiving and transmitting, and/or more than one transceiving antennas. Each of the antennas included in the endpoint devices 210, 220, 230 in an embodiment may be subject to the FCC regulations on specific absorption rate (SAR).

The voice and packet core network 280 shown in FIG. 2 may contain externally accessible computing resources such as containerize applications that may execute at edge compute resources 284 or connect to a remote data center 286. The voice and packet core network 280 may contain multiple intermediate web servers or other locations with accessible data (not shown). The voice and packet core network 280 may also connect to other wireless networks similar to 240 or 250 and additional mobile endpoint devices 210, 220, 230 or similar connected to those additional wireless networks. Connection 282 between the wireless network 240 and edge compute resources 284 or remote data center 286 or connection to other additional wireless networks may be via Ethernet or another similar connection to the worldwide-web, a WAN, a LAN, another WLAN, or other network structure. Such a connection 282 may be made via a WLAN access point/Ethernet switch to the external network and includes a backhaul connection. The access point may be connected to one or more wireless access points in the WLAN before connecting directly to a mobile information handling system or may connect directly to one or more mobile endpoint devices 210, 220, 230. Alternatively, mobile endpoint devices 210, 220, 230 may connect to the external network via base station locations at service providers such as 260 and 270. These service provider locations may be network connected via backhaul connectivity through the voice and packet core network 280.

Remote data centers 286 may include web servers or resources within a cloud environment that operate via the voice and packet core 280 or other wider internet connectivity. For example, remote data centers 286 can include additional information handling systems, data processing servers, network storage devices, local and wide area networks, or other resources as needed or desired. In an embodiment, the remote data center 286 may include one or more servers.

Edge compute systems 284, in an embodiment, may be used to offload processing requirements for each of the mobile endpoint devices 210, 220, 230 described herein. In this embodiment, the edge compute systems 284 may be any computing system or distributed computing systems that places the processing and data storage resources within the network 240 and 250 closer to the mobile endpoint devices 210, 220, 230 to improve response times and save bandwidth while offloading processing of data from the mobile endpoint devices 210, 220, 230 to these edge compute systems 284. In an embodiment, containerized software applications may be executed on the edge compute systems 284 as a bundle of application code, configuration files, libraries, and dependencies used to execute those containerized software applications. During operation of the mobile endpoint devices 210, 220, 230, any applicable containerized software application may be accessed by the respective processing devices in the mobile endpoint devices 210, 220, 230.

Having such edge compute or remote capabilities may permit fewer resources to be maintained at the mobile endpoint devices 210, 220, 230 allowing streamlining and efficiency within those devices. Similarly, remote data center permits fewer resources to be maintained in other parts of network 200. Thus, high data bandwidth wireless links are desired for endpoint devices 210, 220, 230 to interface with greater and greater resources located on a network edge or as a remote data center.

Although network connections 215, 225, and 235 are shown connecting wireless adapters of mobile endpoint devices 210, 220, 230 to wireless networks 240 or 250, a variety of wireless links are contemplated. Wireless communication may link through a wireless access point (Wi-Fi or WiGig), through unlicensed WWAN small cell base stations such as in network 240 or through a service provider tower and base stations such as that shown with service provider A 260 or service provider B 270 and in network 250. In other aspects, mobile endpoint devices 210, 220, 230 may communicate intra-device via intra-device connections 248 when one or more of the mobile endpoint devices 210, 220, 230 are set to act as an access point or even potentially an WWAN connection via small cell communication on licensed or unlicensed WWAN connections. For example, one of the endpoint devices 210, 220, 230 may serve as a Wi-Fi hotspot in an embodiment. Concurrent wireless links to the endpoint devices 210, 220, 230 may be connected via any access points including other mobile information handling systems as illustrated in FIG. 2.

Figure 3:
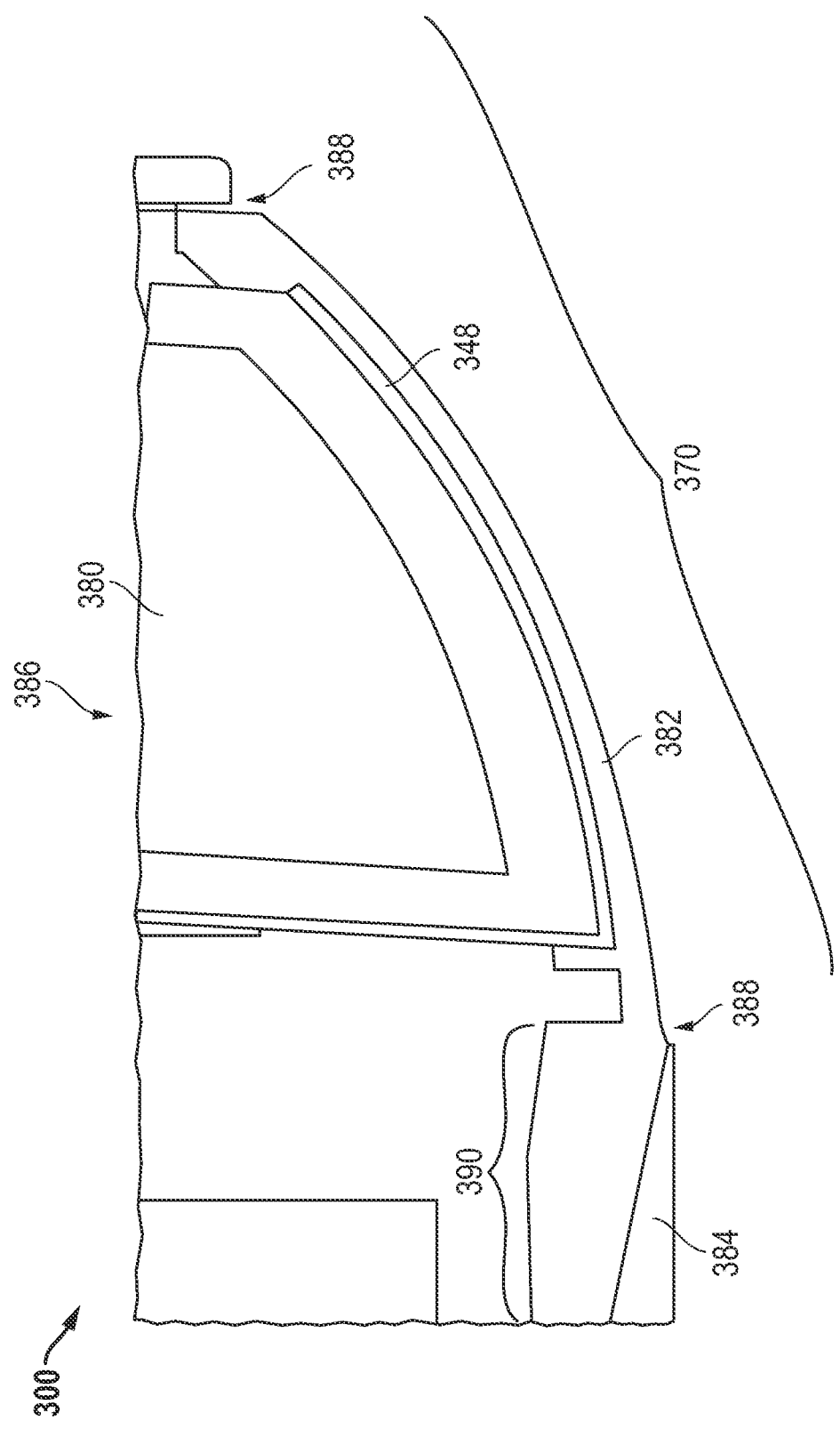
FIG. 3 is a graphic, cross-sectional, diagram of a twice-molded modular antenna according to an embodiment of the present disclosure.

FIG. 3 is a graphic, cross-sectional, diagram of a twice-molded modular antenna 386 within a portion of an information handling system 300 according to an embodiment of the present disclosure. As described herein, the twice-molded modular antenna 386 may include an antenna 348, an antenna holder 380, and an antenna cover 382. As described herein, the twice-molded modular antenna 386 may be integrated into the chassis of the information handling system 300 including, in an example embodiment, a d-cover 384 or base chassis bottom cover of the information handling system 300. In FIG. 3, the twice-molded modular antenna 386 is shown to be at a bottom surface of the information handling system with a base chassis of the information handling system 300 lying flat on a surface such as a table.

In the context of the present specification, the information handling system 300 may include a number of chassis covers that form an outer shell to protect the components of the information handling system 300. For example, the information handling system 300 may be a laptop type information handling system. In these embodiments, the chassis of the information handling system 300 may include a display housing that includes an "a-cover" which serves as a back cover for the display housing and a "b-cover" which may serve as the bezel, if any, for a display screen of the information handling system 300. In this embodiment, this laptop information handling system 300 may have a chassis that forms a base housing and includes a "c-cover" housing a keyboard, touchpad, speaker grill, and any top cover in which these components are set and a "d-cover" housing a processing device, memory the PMU, wireless interface adapter and other components of the information handling system 300 that forms a bottom cover of the base housing for the laptop information handling system. In an embodiment, the base chassis and display chassis may be operatively coupled together via a hinge. The twice-molded modular antenna 386 described herein may be incorporated into any of the chassis described herein at an antenna window 370 in the metal chassis cover. Various locations of any of the a-cover, b-cover, c-cover, or d-cover are contemplated where the twice-molded modular antenna 386 may be coupled to these chassis covers in various embodiments of the present disclosure. FIG. 3 depicts the placement of the twice-molded modular antenna 386 in a d-cover 384 of a base chassis of the information handling system 300 in an example embodiment.

As described herein, the antenna may be any type of antenna that is capable of transceiving data via a network, in an embodiment. Therefore, in another example embodiment, the antenna may be associated with a Wi-Fi or LTE radio used to communicate wirelessly with a remote device via a network. In an example shown in FIG. 3, the antenna may be placed at a location along the chassis of the information handling system 300 where transception at the associated Wi-Fi or LTE antennas can be facilitated.

In an embodiment, the antenna 348 of the twice-molded modular antenna 386 may be molded onto an outer surface of the antenna holder 380. In an embodiment, this molding process includes an injection molding process where the antenna 348 is placed in a mold and a plastic is injected into this mold to form the antenna holder 380 of the twice-molded modular antenna 386. This allows the plastic forming the antenna holder 380 to conform to an inner surface of the antenna 348. The mold may, in an embodiment, secure the antenna 348 therein so that the shape of the antenna 348 may be maintained during this molding process. The shape of the mold may vary depending on the intended form of the antenna holder 380 as well as the intended orientation of the antenna 348 in the twice-molded modular antenna 386. In an embodiment, the antenna 348 may be a metallic antenna structure or an FPCB with an antenna disposed therein in any form and positioned outward along the antenna cover 382 in the antenna window 370 of base chassis d-cover 384.

The twice-molded modular antenna 386 may further include an antenna cover 382. The antenna cover 382, in an embodiment, may be made of a plastic or other RF transparent material that is made to approximate the look, color, texture, or other characteristics of the chassis of the information handling system 300 such as the d-cover 384. This is because the antenna cover 382 is made to be the outer layer of the twice-molded modular antenna 386 that is seen by a user. The type of plastic used may vary and may be selected so as to create an aesthetically pleasing look for the d-cover 384 so as to not indicate or detract the user from seeing the location of the twice-molded modular antenna 386 along the surface of the chassis. Alternatively, the selection of the plastic selected to form the antenna cover 382 may be otherwise aesthetically pleasing regardless of whether a user can identify its location along the surface of the d-cover 384 or not. In an embodiment, the plastic used to form the antenna cover 382 is radio frequency (RF) transparent such that transception of an RF signal by the antenna 348 is not inhibited by the antenna cover 382.

In an embodiment, the antenna cover 382 may be molded onto a surface of the antenna opposite of the surface that the antenna that the antenna holder 380 has been molded onto. This may result, in an embodiment, with the antenna or a portion thereof is sandwiched between the antenna holder 380 and antenna cover 382. In an embodiment, the antenna cover 382 may be injection molded onto the antenna using a mold. In an embodiment, this injection molding process may be conducted prior to or after the injection molding process has been completed to form the antenna holder 380 as described herein.

In another embodiment, the injection molding process may include placing the antenna in a mold and initiating the injection molding process associated with the plastic of the antenna holder 380 and plastic of the antenna cover 382 concurrently. In this embodiment, one or more alignment pins may be used to secure the antenna in place and at a desired form to maintain an arrangement of the antenna within the twice-molded modular antenna 386.

In an embodiment, the injection molding process of the twice-molded modular antenna 386 may be molded onto an outer surface of the antenna holder 380. In an embodiment, this molding process includes a first injection molding process where the antenna 348 is placed in a mold and a plastic is injected into this mold to form the antenna holder 380 of the twice-molded modular antenna 386. This allows the plastic forming the antenna holder 380 to conform to an inner surface of the antenna 348. The mold may, in an embodiment, secure the antenna 348 therein so that the shape of the antenna 348 may be maintained during this molding process. The shape of the mold may vary depending on the intended form of the antenna holder 380 as well as the intended orientation of the antenna 348 in the twice-molded modular antenna 386. A second molding process may include forming the antenna cover 382 into an antenna window 370 formed into the base chassis d-cover 384. This may form a seamless outside surface with the d-cover 384 with the twice-molded modular antenna 386 and antenna holder 380 being placed at an interior surface of the antenna cover 382.

In another embodiment, the shape of the antenna cover 382, along with the antenna and antenna holder 380 molded with the antenna cover 382, may be such that the wireless charging system 386 may fit within a hole formed in the metal chassis (e.g., the d-cover 384) as an antenna window 370. In this embodiment, the modularity of the wireless charging system 386 may allow the twice-molded modular antenna 386 of a wireless charging system 386 to form an interference fit with the d-cover 384 so that the twice-molded modular antenna 386 of the wireless charging system 386 cannot be dislodged once placed within the hole of the antenna window 370. Alternatively, or additionally, the antenna cover 382 may include a number of interference ledges 388 that are formed such that an interference fit may be formed between the interference ledges 388 and the d-cover 384 of the information handling system 300 or other chassis parts. In an embodiment, the materials used to form the twice-molded modular antenna 386 may be slightly bendable such that it can be elastically bent slightly and placed into the hole formed into the d-cover 384 at, for example, antenna window 370. In this embodiment, when the force used to elastically bend the twice-molded modular antenna 386 of the wireless charging system is released, the antenna cover 382 of the twice-molded modular antenna 386 of the wireless charging system elastically returns to its original shape causing the antenna cover 382 to be wedged against the d-cover 384 at the interference ledges 388. Additionally, or alternatively, one or more holes or shafts may be formed into an antenna cover extension section 390 and may interface mechanically at an interior surface of the d-cover 384 where the antenna cover extension section 390 over laps with the d-cover 384 or other chassis of the information handling system 300 to secure the twice-molded modular antenna 386 of the wireless charging system at the hole at, for example, antenna window 370 formed in the d-cover 384 or other chassis.

In an embodiment, by making the twice-molded modular antenna 386 modular, the replacement of the twice-molded modular antenna 386 for the wireless charging system if damaged may be relatively easier. Further, during manufacture, the twice-molded modular antenna 386 may be appropriately sized for the antenna window 370 formed in the chassis of the information handling system 300 via the molding processes described herein which allows for a customizable interference fit where necessary to secure the twice-molded modular antenna 386 of the wireless charging system to the chassis.

Still further, the molding of the antenna cover 382 to the antenna 348 in either a single process or a two-step process as described herein allows for the thickness of the antenna cover 382 to be reduced. Indeed, in some example embodiments, the thickness of the antenna cover 382 may be reduced by around 0.3 to 0.8 mm and places the antenna element closer to the outer surface of the base chassis d-cover 384. This may reduce the transception distance from around 2.1 mm to 1.5 mm thereby increasing the transmission efficiency by up to 11% when the antenna 348 is transmitting data. Further, it allows for a smaller antenna window 370 by moving the antenna 348 closer to the to the surface of the base chassis because the size of the window 370 can be reduced with less interference from the metallic base chassis d-cover 384 portions around the window 370.

As described herein, the present specification contemplates that the antenna 348 may be any type of antenna used to transmit data such as a WiFi antenna or a 5G antenna. These types of antennas may be formed in a similar manner as described herein with the antennas being injection molded with the plastic antenna holder 380 and antenna cover 382. These transceiving antennas still benefit from the reduced thickness of the antenna cover 382 by placing the antennas relatively closer to an exterior surface of the d-cover 384 or other chassis cover thereby increasing the transception capabilities of these types of antennas or reducing antenna window 370 size. Additionally, by placing these antennas relatively closer to an exterior plane of the d-cover 384, the transmission interference with the metal d-cover 384 is also reduced. The antenna 348, in an alternative embodiment, may be a wireless charging system, a transmitting antenna, or both based on the type of system used. For example, where the antenna 348 is operated using an NFC radio, the antenna 348 may be used to concurrently charge a peripheral device as well as form a communication link with the information handling system 300.

These antennas may be placed within the chassis of the information handling system 300 where transception is possible regardless of the orientation of a base chassis of the information handling system 300 relative to the display chassis. For example, the orientation of a base chassis of the information handling system 300 relative to the display chassis may be a tablet orientation where the d-cover 384 of the base chassis faces an a-cover of the display chassis. In this orientation, a twice-molded modular antenna 386 of a wireless charging system may be placed in the d-cover 384 at and edge opposite an edge where the display chassis is operatively coupled to the base chassis as seen in FIG. 3. Because this edge is curved, the twice-molded modular antenna 386 of the wireless charging system may be placed there so that an angle of attack may increase the transception capabilities of the antenna 348.

Figure 4:
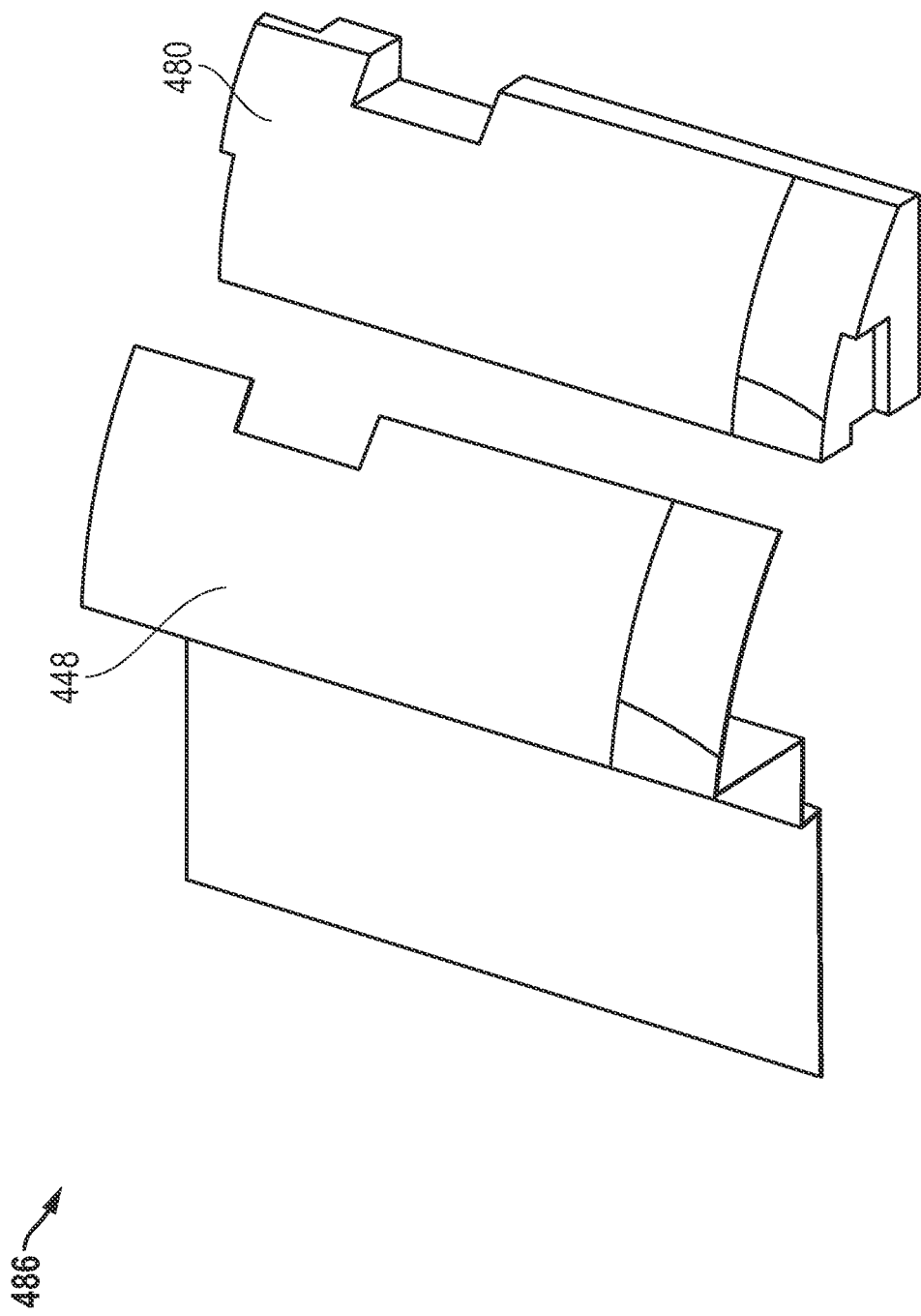
FIG. 4 is a graphic perspective view of a twice-molded modular antenna according to another embodiment of the present disclosure.

FIG. 4 is a graphic perspective view of a twice-molded modular antenna 486 according to an embodiment of the present disclosure. FIG. 4 shows an antenna 448 and an antenna holder 480 separate from each other. As described herein, the antenna holder 480 may be molded onto the antenna 448 or visa-versa. In an embodiment, the antenna 448 may be placed in a mold. At this point, a plastic may be injected into the mold and molded onto the surface of the antenna 448 forming a first molding. In an embodiment, the antenna 448 may include surface features that facilitates a stronger bond between the antenna 448 and the injection molded plastics forming the antenna holder 480. These surface features may include shelves, bends, edges and other surface features used to better bond the injection molded plastic or other RF material to be molded against a first side of the antenna 448.

Figure 5:
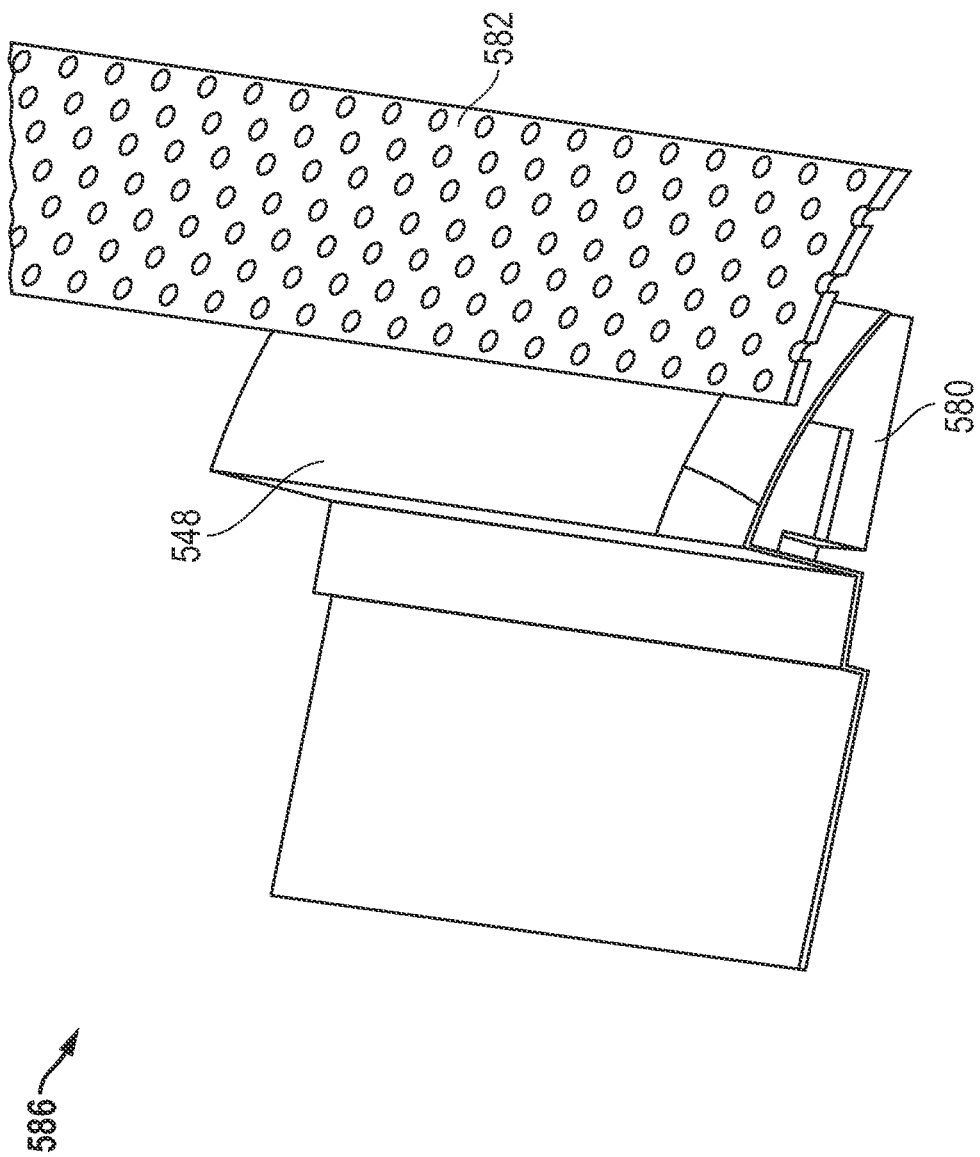
FIG. 5 is a graphic perspective view of a twice-molded modular antenna according to another embodiment of the present disclosure.

FIG. 5 is a graphic perspective view of a twice-molded modular antenna 586 according to another embodiment of the present disclosure. The twice-molded modular antenna 586 of FIG. 5 may be similar to the twice-molded modular antenna of FIG. 4 with an additional molding of the antenna cover 582 on the antenna 546. FIG. 5 shows the antenna holder 580 being molded onto a first side of the antenna 546. The antenna cover 582 is shown as a separate piece from the twice-molded modular antenna 586 in an exploded view of the twice-molded modular antenna 586.

As described herein, the antenna cover 582 may be a plastic cover surface that is molded onto a second side of the antenna 546 opposite the side of the antenna 546 where the antenna holder 580 is molded onto the antenna 546. In an embodiment, the antenna cover 582 is injection molded onto the second side of the antenna 546. The injection molding process may be completed by placing the antenna 546 with the molded antenna holder 580 into a second mold and injecting the plastic forming the antenna cover 582 into the mold to form the antenna cover 582. This is a twice-molding process that uses two separate molds to injection mold the antenna cover 582 onto the antenna and antenna holder 580 onto the antenna 546 in any order.

In an embodiment, the injection molding process of the twice-molded modular antenna 586 may be molded onto an outer surface of the antenna holder 580. In an embodiment, this molding process includes a first injection molding process where the antenna 548 is placed in a mold and a plastic is injected into this mold to form the antenna holder 580 of the twice-molded modular antenna 586. This allows the plastic forming the antenna holder 580 to conform to an inner surface of the antenna 548. The mold may, in an embodiment, secure the antenna 548 therein so that the shape of the antenna 548 may be maintained during this molding process. The shape of the mold may vary depending on the intended form of the antenna holder 580 as well as the intended orientation of the antenna 548 in the twice-molded modular antenna 586. A second molding process may include forming the antenna cover 582 into an antenna window formed into the base chassis d-cover 584. This may form a seamless outside surface with the d-cover with the twice-molded modular antenna 586 and antenna holder 580 being placed at an interior surface of the antenna cover 582.

In an embodiment, the antenna cover 582 may be press fit or otherwise have an interference fit with the window formed in the d-cover. As described herein, the antenna cover 582 may be first press fitted into the window with the molded antenna 580 and antenna 548 being secured to the antenna cover 582. In an alternative embodiment, the molded antenna 548, antenna holder 580, and antenna cover 582 may be, together, press fitted or interference fitted into the window formed in a chassis of the information handling system.

In an alternative embodiment, the injection molding process that molds the antenna holder 580 to first side of the antenna 546 and the antenna cover 582 to a second side of the antenna 546 may involve a single molding process. In this embodiment, the single molding process may include placing the antenna 546 in a mold and initiating the injection molding process associated with the plastic of the antenna holder 580 and plastic of the antenna cover 582 concurrently. In this embodiment, one or more alignment pins may be used to secure the antenna 546 in place and at a desired form to maintain an arrangement of the antenna 546 within the twice-molded modular antenna 586.

Figure 6:
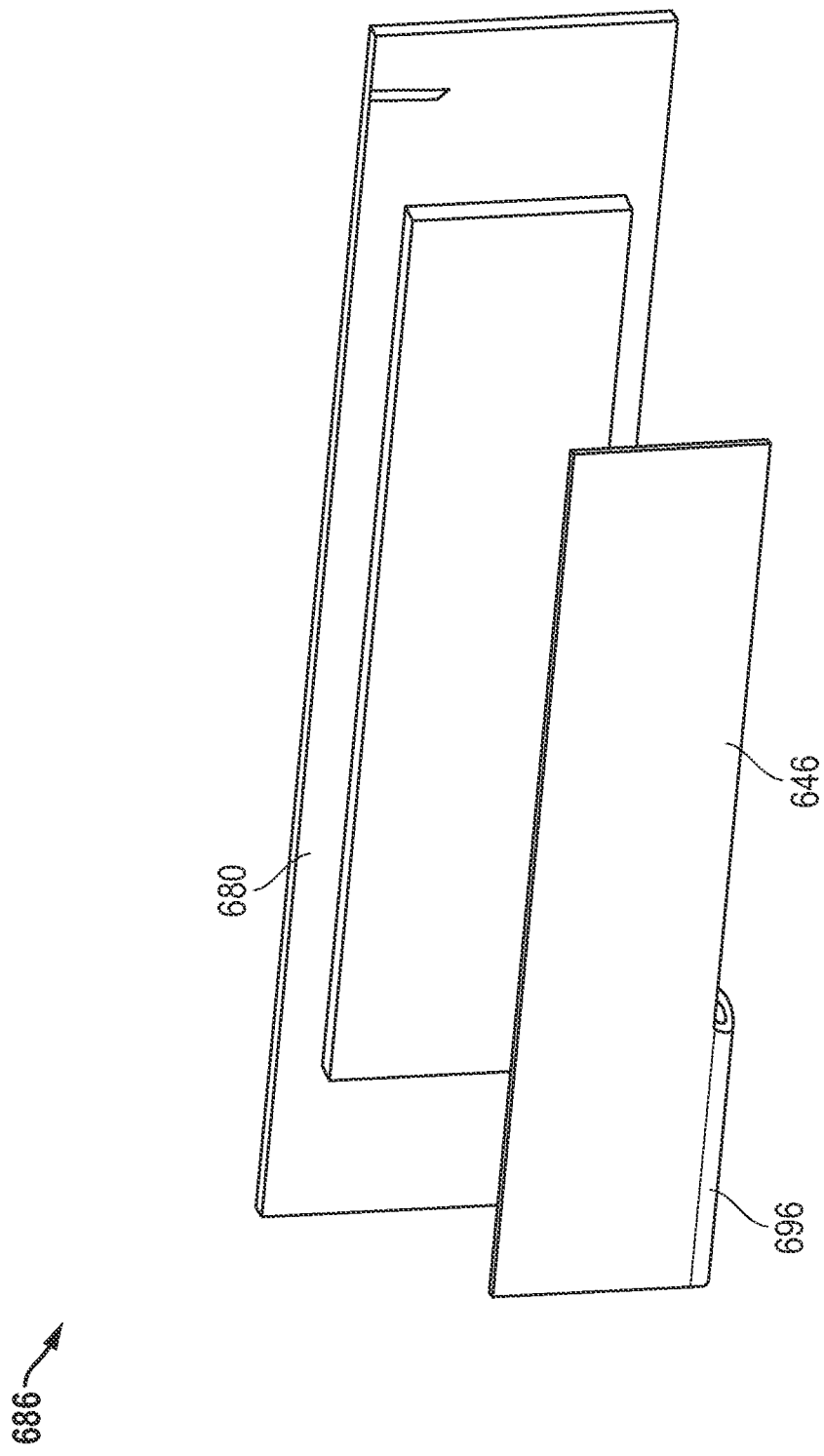
FIG. 6 is a graphic perspective view of a twice-molded modular antenna of a wireless charging system according to an embodiment of the present disclosure.

FIG. 6 is a graphic perspective view of a twice-molded modular antenna 686 of a wireless charging system according to another embodiment of the present disclosure. Similar to FIG. 4, the twice-molded modular antenna 686 includes an antenna and/or charging coil 646 and an antenna holder 680 molded onto a first side of the antenna and/or charging coil 646. In this embodiment, because an NFC antenna may create the inductive field used to charge devices as well as communicate with some devices, the antenna 646 is described as both a charging and communication antenna. The example embodiment of the twice-molded modular antenna 686 shown in FIG. 6 is generally flat allowing the twice-molded modular antenna 686 to be coupled along or molded into a flat outer surface of a chassis cover of the information handlings systems described herein. In an embodiment, the antenna and/or charging coil 646 being flat and closer to an outer surface of a chassis cover and, thus, closer to a receiving charging coil (not shown) of an input/output device such as a stylus may increase the efficiency of charging when operated as such.

In some embodiments herein, the antenna and/or charging coil 646 may include a lead 696 that operatively coupled to the antenna and/or charging coil 646 to a radio such as the NFC radio or other antenna radio or a charging controller and PMU as described herein. In an embodiment, the lead 696 may extend out from an away from any plastic molded onto the antenna and/or charging coil 646.

Figure 7:
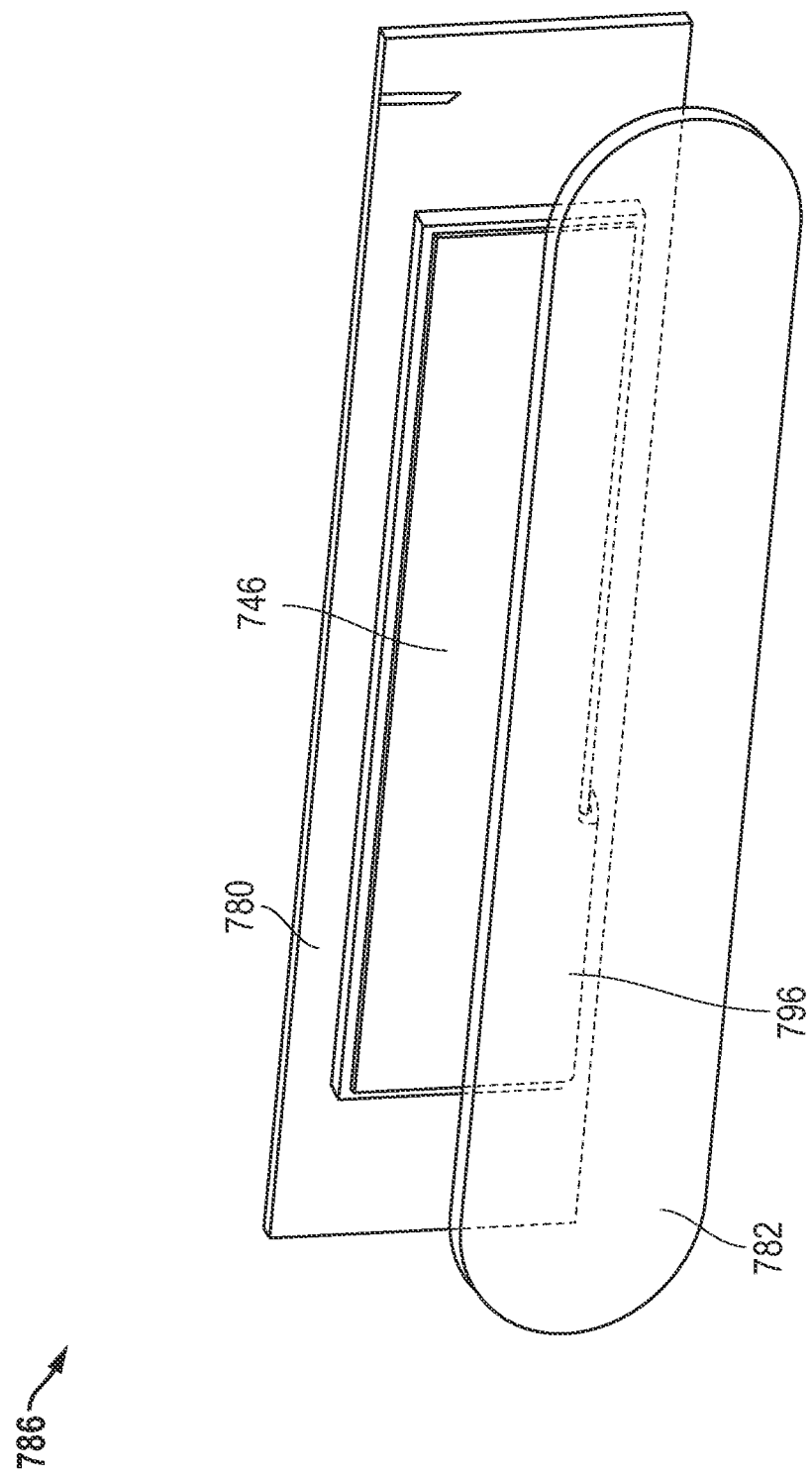
FIG. 7 is a graphic perspective view of a twice-molded modular antenna of a wireless charging system according to another embodiment of the present disclosure.

FIG. 7 is a graphic perspective view of a twice-molded modular antenna 786 of a wireless charging system according to another embodiment of the present disclosure. The twice-molded modular antenna 786, similar to FIG. 6, includes an antenna holder 780 molded onto a first side of an antenna and/or charging coil 746 on a first side of the twice-molded modular antenna 786. In an embodiment, the antenna holder 780 is injection molded onto the antenna and/or charging coil 746 by placing the antenna and/or charging coil 746 in a mold and injecting the plastic forming the antenna holder 780 into the mold and allowing the plastic to cure or cool. During this process, the lead 796 from the antenna and/or charging coil 746 may extend past or through the antenna holder 780 and later be operatively coupled to an antenna radio when the twice-molded modular antenna 786 is placed in the chassis of the information handling system.

In the embodiment, the twice-molded modular antenna 786 includes an antenna cover 782. The antenna cover 782 is shown as a separate piece from the twice-molded modular antenna 786 as an exploded view of the twice-molded modular antenna 786. As described herein, the antenna cover 782 may be a plastic that is molded onto a second side of the antenna and/or charging coil 746 opposite the side of the antenna and/or charging coil 746 where the antenna holder 780 is molded onto the antenna and/or charging coil 746. In an embodiment, the antenna cover 782 is injection molded onto the second side of the antenna and/or charging coil 746. The injection molding process may be completed by placing the antenna and/or charging coil 746 with the molded antenna holder 780 into a second mold and injecting the plastic forming the antenna cover 782 into the mold to form the antenna cover 782. This is a twice-molding process that uses two separate molds to injection mold the antenna cover 782 onto the antenna and/or charging coil 746 and antenna holder 780 onto the antenna and/or charging coil 746 in any order.

In an embodiment, the injection molding process of the twice-molded modular antenna 786 may be molded onto an outer surface of the antenna holder 780. In an embodiment, this molding process includes a first injection molding process where the antenna and/or charging coil 746 is placed in a mold and a plastic is injected into this mold to form the antenna holder 780 of the twice-molded modular antenna 786. This allows the plastic forming the antenna holder 780 to conform to an inner surface of the antenna and/or charging coil 746. The mold may, in an embodiment, secure the antenna and/or charging coil 746 therein so that the shape and orientation of the antenna and/or charging coil 746 may be maintained during this molding process. The shape of the mold may vary depending on the intended form of the antenna holder 780 as well as the intended orientation of the antenna and/or charging coil 746 in the twice-molded modular antenna 786. A second molding process may include forming the antenna cover 782 into an antenna window (not shown) formed into the base chassis d-cover (not shown). This may form a seamless outside surface with the d-cover with the twice-molded modular antenna 786 and antenna holder 780 being placed at an interior surface of the antenna cover 782. Still further, as a result of the second molding being conducted at the antenna window and affixing the antenna 746 and antenna holder 780, the antenna and/or charging coil 746 is presented closer to an outer surface of the chassis cover. This also reduces transception interference with the metal chassis of the information handling system. Still further, because the antenna and/or charging coil 746 may be used to charge a peripheral device, the decreased distance between the antenna 746 and a receiving charging coil within a peripheral device increases the charging capabilities of the antenna and/or charging coil 746 and may reduce the time to fully charge a battery within a peripheral device. In another embodiment, the antenna holder 780, antenna 746, and antenna cover 782 may be press fit into or made to have an interference fit within a window formed into the metal chassis of the information handling system.

In an alternative embodiment, the injection molding process that molds the antenna holder 780 to first side of the antenna and/or charging coil 746 and the antenna cover 782 to a second side of the antenna and/or charging coil 746 may involve a single molding process. In this embodiment, the single molding process may include placing the antenna and/or charging coil 746 in a mold and initiating the injection molding process associated with the plastic of the antenna holder 780 and plastic of the antenna cover 782 concurrently. In this embodiment, one or more alignment pins may be used to secure the antenna and/or charging coil 746 in place and at a desired form to maintain an arrangement of the antenna and/or charging coil 746 within the twice-molded modular antenna 786.

Figure 8:
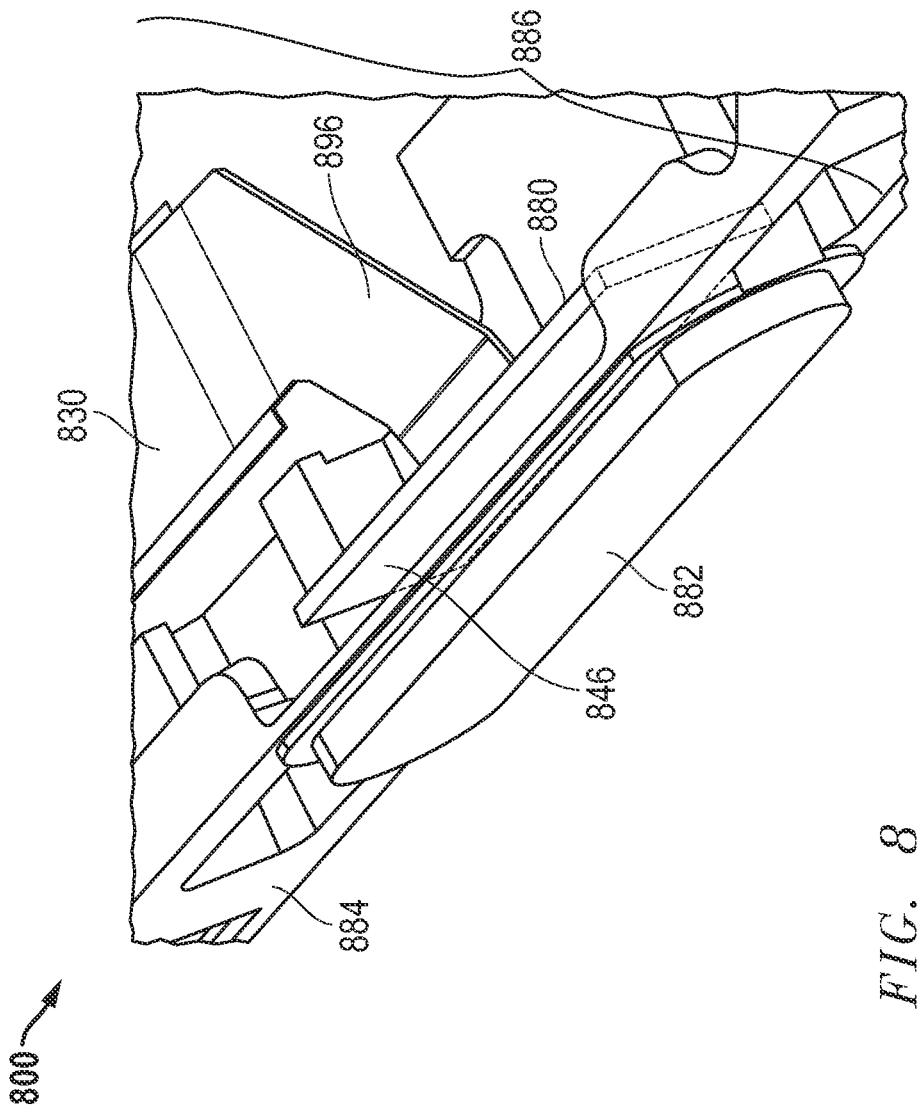
FIG. 8 is a perspective view of a twice-molded modular antenna of a wireless charging system according to another embodiment of the present disclosure.

It is contemplated that a receiving antenna and/or charging coil 746 may be formed via a twice molded process into an outer surface of stylus similar to the twice-molded modular antenna in the base chassis side wall of an information handling system described according to the embodiments of FIG. 7 and other embodiments herein. The sidewall of the stylus may be made of metal with an antenna window into which a molded antenna or receiving charging coil 746 on an antenna holder 780 is molded into the window in the stylus sidewall. In this way, the receiving antenna and/or charging coil 7466 may be closer to the surface of the stylus as well as closer to any charging coil antenna of the magnetically or otherwise coupled side wall or base chassis cover of an information handling system for more efficient and effective inductive wireless power transfer FIG. 8 is a perspective view of a twice-molded modular antenna 886 of a wireless charging system according to another embodiment of the present disclosure. FIG. 8 shows a portion of the d-cover 884 of the information handling system 800. In an embodiment, the d-cover 884 may include additional material into which the antenna cover 882 is placed and made flush with an outer surface of the d-cover 884. In an embodiment, the antenna cover 882 may be formed into an antenna window via a second injection molding step, press fit, or otherwise have an interference fit with the hole formed in the d-cover 884 for an antenna window.

FIG. 8 also shows a relative placement of the antenna and/or charging coil 846 and antenna holder 880 to the antenna cover 882. As described herein in some embodiments, the antenna and/or charging coil 846 may be molded against the antenna and/or charging coil 846 although FIG. 8 shows that the antenna and/or charging coil 846 is injection molded with the antenna cover 882. In an alternative embodiment, the antenna and/or charging coil 846 may abut the inner surface of the antenna cover 882 rather than be molded with the antenna cover 882.

As described herein, the antenna and/or charging coil 846 includes a lead 896 that operatively couples the antenna and/or charging coil 846 to an antenna radio 830. As described herein, the antenna radio 830 may include any type of antenna radio such as a NFC radio, a WLAN radio (e.g., WiFi radio), a WWAN radio (e.g., an LTE radio) and the like. In an embodiment, the information handling system 800 may include a plurality of these twice-molded modular antennas 886 associated with an antenna radio 830.

The twice-molded modular antenna 886 in FIG. 8 may have a generally flat outer surface. Unlike the twice-molded modular antenna in FIG. 3, the twice-molded modular antenna 886 in FIG. 8 may be arranged on a relatively flatter surface on the chassis of the information handling system 800 such as a side wall of the d-cover 884. However, the present specification contemplates that, with the use of the injection molding processes described herein, the shape of the twice-molded modular antenna 886 may vary depending on the location within the information handling system 800 that the twice-molded modular antenna 886 is placed in.

In an embodiment, the twice-molded modular antenna 886 allows the charging coils or antenna 846 to be disposed closer to the outer surface of the chassis of the information handling system. This may result in an improvement of charging of an input/output device such as a stylus magnetically coupled along the side of the d-cover 884 or may permit better antenna transception and a smaller antenna window while limiting interference from the metal chassis cover.

Figure 9:
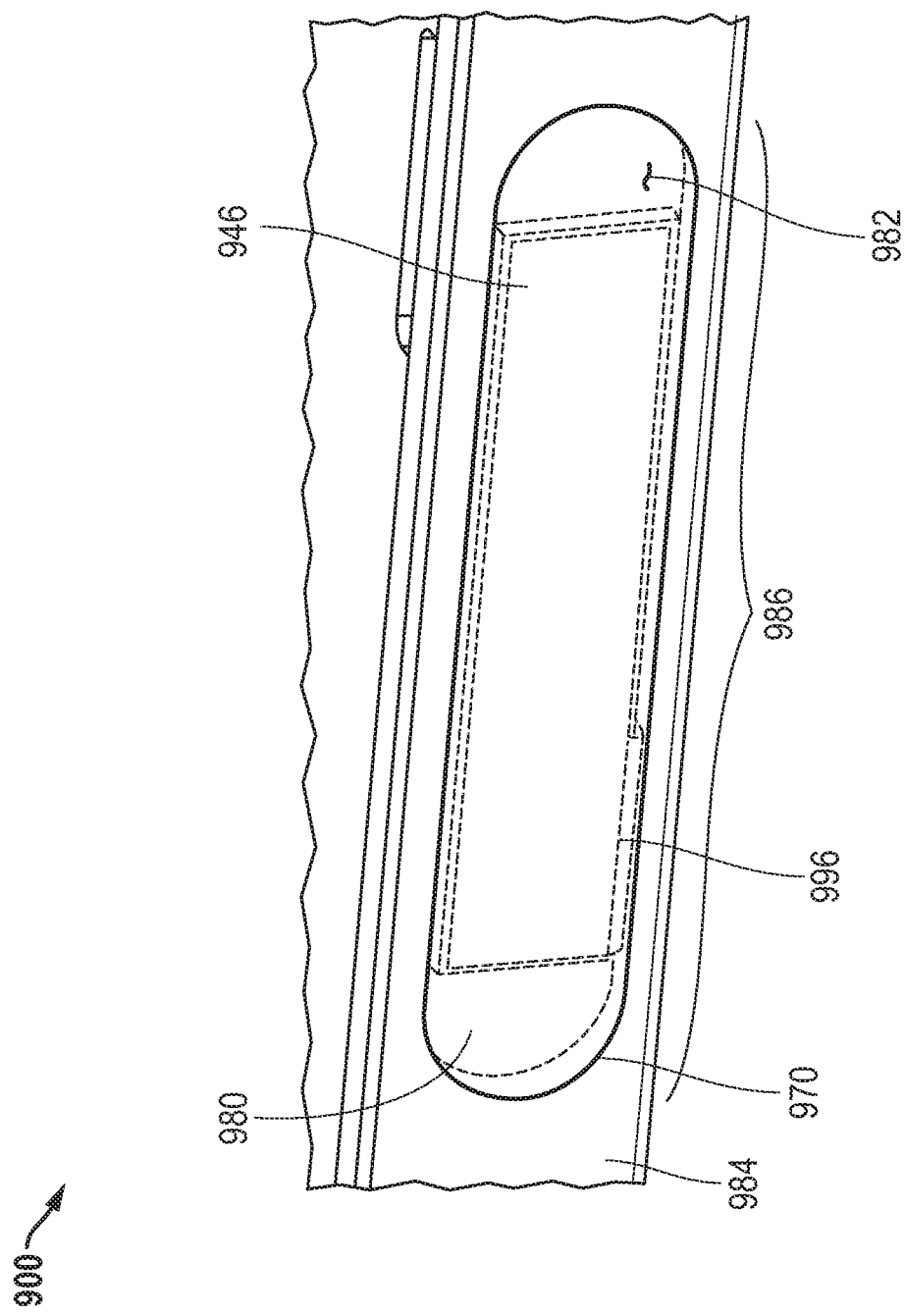
FIG. 9 is a perspective view of a twice-molded modular antenna of a wireless charging system according to another embodiment of the present disclosure.

FIG. 9 is a perspective view of a twice-molded modular antenna 986 of a wireless charging system according to another embodiment of the present disclosure. The twice-molded modular antenna 986 may be similar to the twice-molded modular antenna shown in FIG. 8 and, in this view, the twice-molded modular antenna 986 is injection-mold formed into or interference fit into an antenna window 970 to be made flush with an outer surface of the d-cover 984 of the information handling system 900. In FIG. 9, the antenna cover 982 is shown as clear so that the antenna holder 980 and antenna and/or charging coil 946 can be seen in FIG. 9. However, it is appreciated that the antenna cover 982 may be opaque or otherwise colored to, for example, match a color of the metal surface of the d-cover 984 so as to render the information handling system 900 aesthetically appealing and hiding the location of the twice-molded modular antenna 986 and antenna window 970.

As described herein, the antenna cover 982, when the twice-molded modular antenna 986 is installed in antenna window 970, it is made to lay flush with the outer surface of the d-cover 984 or other chassis of the information handling system 900. In an embodiment, the antenna cover 982 is made to lay flush with the outer surface of the d-cover 984 so that a user cannot discern where the twice-molded modular antenna 986 is located in order to increase the aesthetic appeal of the information handling system 900. In an embodiment, the antenna 982 allows the charging coils or antenna 946 to be disposed closer to the outer surface of the chassis of the information handling system. This may result in an improvement of charging of an input/output device such as a stylus magnetically coupled along the side of the d-cover 984 or an improved transception via an antenna in a smaller antenna window with reduced interference from a metal chassis cover. This may, in an embodiment, increase the charging efficiency of the antenna and/or charging coil 946 by around 26.44% when the antenna and/or charging coil 946 is used to as a charging coil As described herein, in some embodiments, the antenna and/or charging coil 946 may include a lead 996 that operatively coupled to the antenna and/or charging coil 946 and extends internally to a radio such as the NFC radio, WiFi radio, BT radio, LTE radio, or other antenna radio described herein. In an embodiment, the lead 996 may extend internally from the antenna and/or charging coil 946 into the d-cover 984 chassis where the radio or charge controller and PMU may be disposed.

Figure 10:
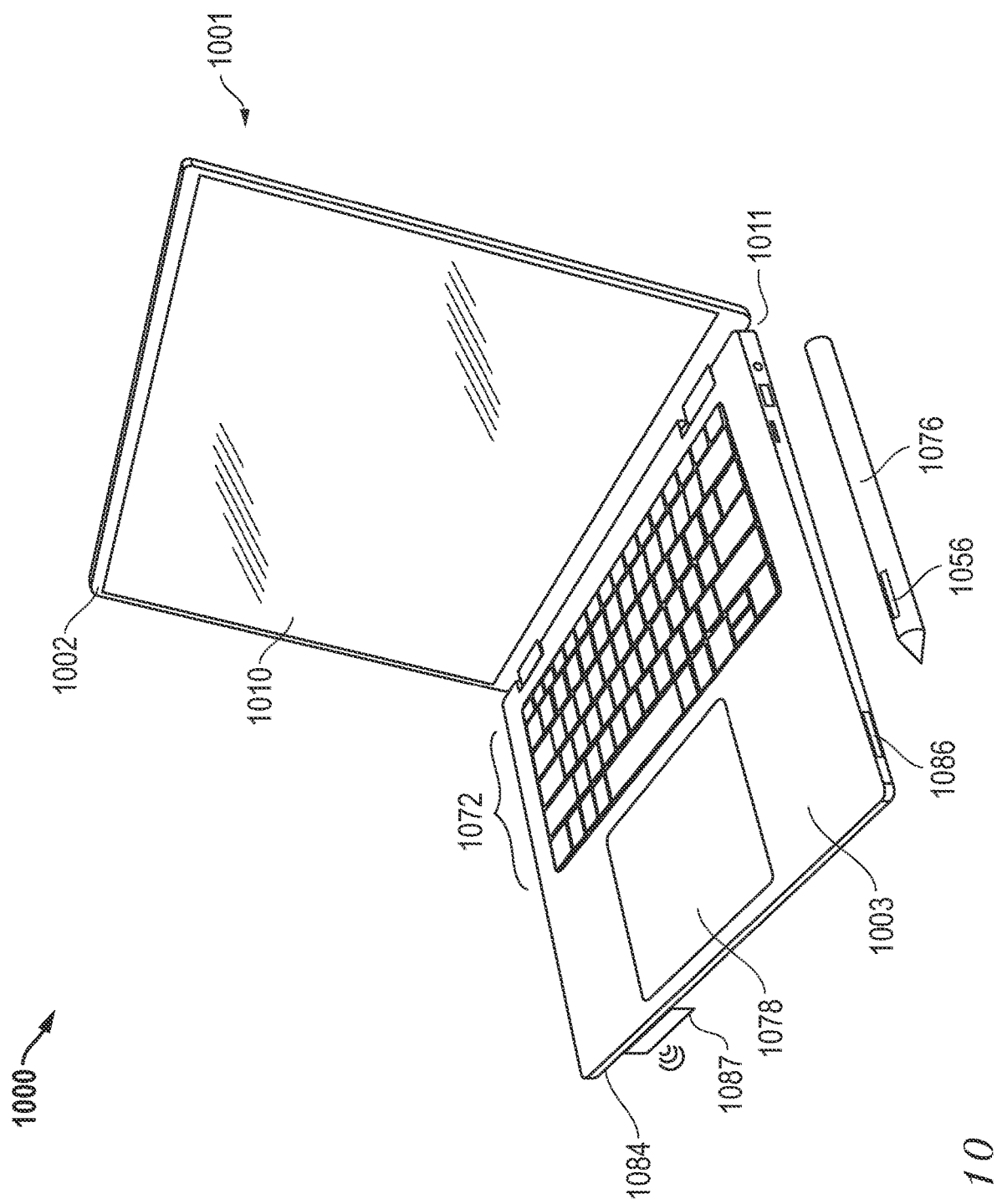
FIG. 10 is a graphic diagram of an information handling system including a wirelessly rechargeable peripheral device according to another embodiment of the present disclosure.

FIG. 10 is a graphic diagram of an information handling system 1000 including a wirelessly rechargeable peripheral device 1012 according to another embodiment of the present disclosure. As described herein, the information handling system 1000 may include a number of chassis that for an outer shell to protect the components of the information handling system 1000. In the example embodiment shown in FIG. 10, the information handling system 1000 may be a laptop type information handling system 1000. In these embodiments, the chassis of the information handling system 1000 may include a display housing that includes an a-cover 1001 which serves as a back cover for the display housing and a b-cover 1002 which may serve as the bezel, if any, for a display screen 1010 of the information handling system 1000. In this embodiment, this laptop information handling system 1000 may have a chassis that forms a base housing and includes a c-cover 1003 housing a keyboard 1072, touchpad 1078, and any cover as a top cover of the base chassis in which these components are set. The base chassis may also include a d-cover 1084 housing a processing device, memory the PMU, wireless interface adapter and other components of the information handling system 1000 in the base housing for the laptop information handling system 1000. In an embodiment, the base chassis and display chassis may be operatively coupled together via a hinge 1011. The twice-molded modular antenna 1086 described herein may be incorporated into any of the chassis covers described herein and any various locations where the twice-molded modular antenna 1086 may be formed into or coupled to these chassis covers at an antenna window are contemplated in the present disclosure. FIG. 10 depicts the placement of the twice-molded modular antenna 1086 in, in this example embodiment, a sidewall of the d-cover 1084 of a base chassis of the information handling system 1000. Although FIG. 10 shows a specific type of information handling system 1000 and a stylus 1076 as a peripheral device, the present specification contemplates that other types of information handling systems and peripheral devices may be used.

It is appreciated that a twice-molded modular antenna 1086 or 1087 may be any type of antenna operating under any of these wireless protocols. A first use of the twice-molded modular antenna 1086 may be used as an NFC antenna that can be used to be operatively and wirelessly coupled to a receiving charging coil 1056 housed within a wireless peripheral device such as the stylus 1076 shown or any other type of peripheral devices such as a mouse or wireless keyboard. In an embodiment, a plurality of twice-molded modular antennas 1086, 1087 may be used to support a plurality of different antennas providing a modular antenna that places the antenna at a location closer to an edge surface of the chassis cover of the information handling system 1000 thereby increasing the transmission and reception capabilities of the antennas of the twice-molded modular antennas such as antenna 1087 for Wi-Fi, BT, or LTE communications.

As described herein, the stylus 1076 may include an RX charging coil 1056. This RX charging coil 1056 receives a fluctuating magnetic field emitted from the charging/communication coil of the twice-molded modular antenna 1086 operatively coupled to an NFC radio charge controller and PMU of the information handling system 1000. This fluctuating magnetic field is converted back into alternating current at the RX charging coil 1056 of the stylus 1076 and, in an embodiment, converted into DC via a rectifier and used to either power the stylus 1076 or charge a power storage device (e.g., a battery) in the stylus 1076. This process of charging is initiated and controlled via operation of the wireless charging controller, for example. It is appreciated that, although FIG. 10 shows the stylus 1076 includes a RX charging coil 1056, other peripheral devices may also include a similar RX charging coil 1056 that interfaces in a similar way with the charging/communication coil 1046 of the NFC radio. Therefore, in other embodiments, any of a wireless keyboard, a mouse, a headset, or other types of peripheral devices (e.g., any input/output device 112) may include a RX charging coil 1056 used to interface with the charging/communication coil of the NFC radio as described herein.

FIG. 10 shows the information handling system 1000 in an open or clamshell configuration. This configuration has the base chassis including the c-cover 1003 and d-cover 1084 laying on a surface with a display chassis including an a-cover 1001 and b-cover 1002 upright so that the user may view the display device 1010. Other configurations are anticipated in the present disclosure and may include a tablet orientation. The tablet orientation may include the c-cover 1003 being placed on the surface with the keyboard 1072 face down and the d-cover 1084 facing the a-cover 1001 such that the base chassis and display chassis run generally parallel to each other. As described herein, a potential location of the twice-molded modular antenna 1086 or 1087 may be at a location on the d-cover next to the touchpad 1078 and closest to the user when the information handling system 1000 is in the clamshell configuration as shown in FIG. 10. When the information handling system 1000 is in a tablet orientation, however, the twice-molded modular antenna 1086 is now pointed at an angle upwards and away as shown in FIG. 3 for example. In this embodiment, due to the metal a-cover 1001 potentially inhibiting the transception of the twice-molded modular antenna 1087, the antenna cover of the twice-molded modular antenna 1086 places the antenna of the twice-molded modular antenna 1087 relatively closer to an exterior surface of the d-cover 1084 thereby increasing the transception capabilities of these types of antennas than would otherwise be realized without the twice-molded modular antenna 1087 described herein. Further, the antenna of the twice-molded modular antenna 1087 closer to the exterior surface of the antenna window and to the base chassis d-cover 1084 also permits a reduced size antenna window relative to previous antennas disposed at a similar antenna window.

Figure 11:
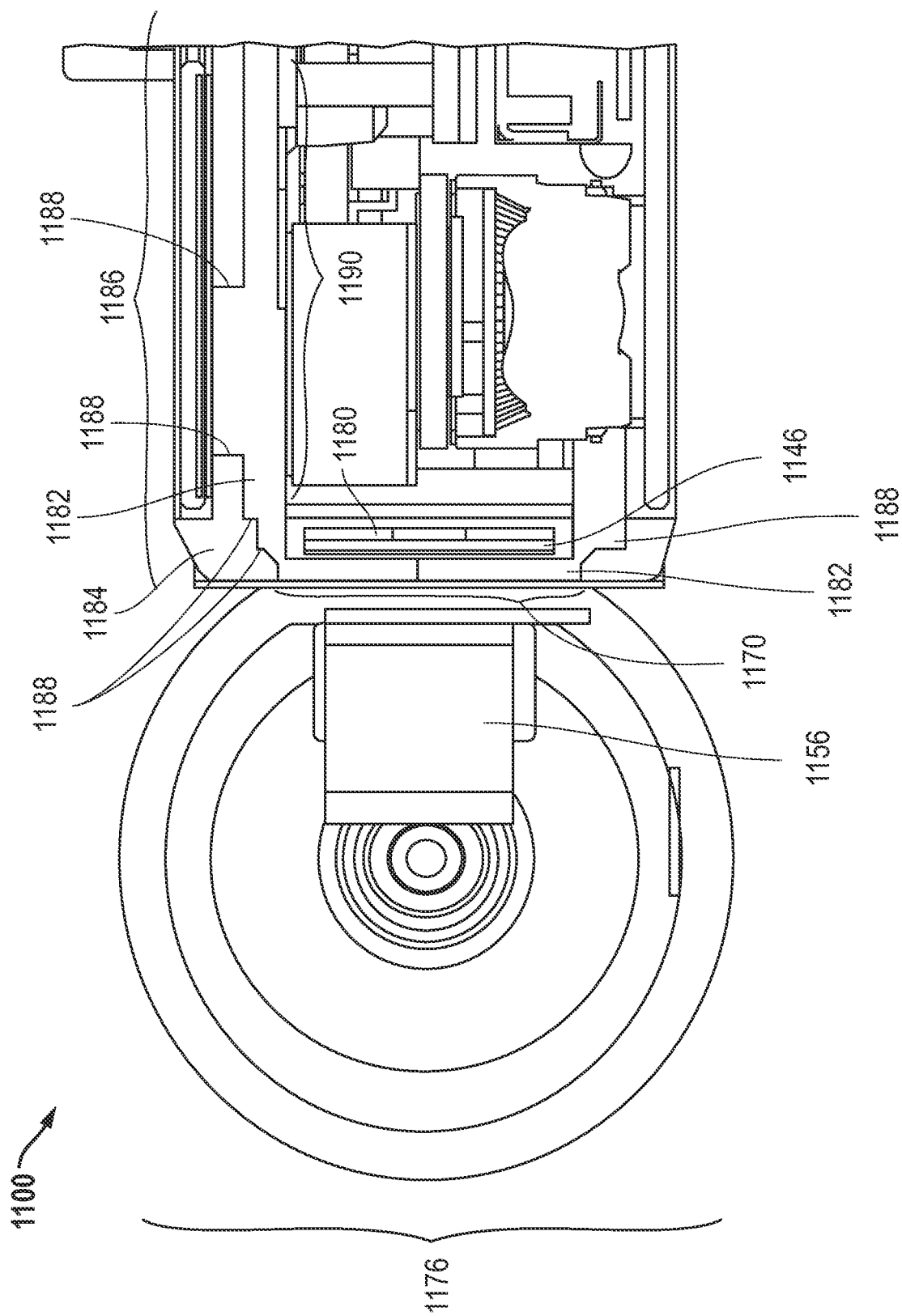
FIG. 11 is a cross-sectional, graphic diagram of a wireless charging system interfacing with a wirelessly rechargeable peripheral device according to another embodiment of the present disclosure.

FIG. 11 is a cross-sectional, graphic diagram of a wireless charging system that includes a twice-molded modular antenna 1186 interfacing with a wirelessly rechargeable peripheral device such as a stylus 1176 according to another embodiment of the present disclosure. As shown in FIG. 11, the stylus 1176 may be brought close to the twice-molded modular antenna 1186 with its antenna and/or charging coil 1146 used, in an example embodiment, to charge a battery of the stylus 1176 or otherwise provide power to the stylus 1176.

As described herein a charging/communication coil 1146 may be incorporated into the twice-molded modular antenna 1086 that causes the charging/communication coil 1146 to be placed closer to an outer surface of the chassis housing (e.g., d-cover 1184) than would a similar charging/communication coil placed, for example, behind a dedicated window formed into the housing of the chassis of the information handling system 1100 in previous systems with an antenna cover attached over an antenna window 1170 instead of the twice-molded modular antenna 1087. Additionally, because the twice-molded modular antenna 1186 is modular, production of the chassis of the information handling system 1100 may include customized locations where the module may be molded into or interference fit into an antenna window 1170 in the chassis cover.

In an embodiment, the antenna and/or charging coil 1146 may be made of a flexible substrate such as a flexible printed circuit board (FPCB). In an embodiment, the antenna and/or charging coil 1146 may include a charging coil embedded into or formed on the FPCB that is operatively coupled to a charging controller and a PMU. The charging coil, in this embodiment, may be used to transmit the fluctuating magnetic field used in this inductive charging process. Additionally, or alternatively, the FPCB may include an antenna therein. As described herein, the charging coil formed on the FPCB may be used to both transceive data but also transmit the fluctuating magnetic field for inductive charging. In the embodiments where the antenna and/or charging coil 1146 is switched out with or included with an antenna (e.g., WiFi or 5G antenna), the antenna may also be embedded into the FPCB. In the embodiments where no charging coil is used, the antenna may be a metal piece use to transceive data via an edge of the metal piece or an antenna structure printed or formed on the FPCB.

In an embodiment, the twice-molded modular antenna 1186 includes an antenna holder 1180, an antenna and/or charging coil 1146, and an antenna cover 1182. In an embodiment, the shape of the antenna cover 1182, along with the antenna and/or charging coil 1146 and antenna holder 1180 molded with the antenna cover 1182, may be such that the wireless charging system 1186 may be injection molded or formed to fit within an antenna window 1170 hole formed in the metal chassis (e.g., the d-cover 1184). In this embodiment, the modularity of the wireless charging system may allow the wireless charging system to be injection molded or formed to an interference fit with the d-cover 1184 so that the wireless charging system cannot be dislodged once placed within the hole.

Alternatively, or additionally, the wireless charging system and, in an embodiment, the antenna cover 1182 may include a number of interference ledges 1188 may be formed on the antenna cover 1182 or other piece of the wireless charging system such that an interference fit may be formed between the interference ledges 1188 and the d-cover 1184 of the information handling system 1100 or other chassis parts. In an embodiment, the pliability of the twice-molded modular antenna 1186 may be such that it can be elastically bent slightly and placed into the hole formed into the d-cover 1184. In this embodiment, when the force used to bend the wireless charging system slightly is released, the antenna cover 1182 of the wireless charging system elastically returns to its original shape causing the antenna cover 1182 to be wedged against the d-cover 1184 at the interference ledges 1188. Additionally, or alternatively, one or more holes or shafts may be formed into an antenna cover extension section 1190 and may interface mechanically at an interior surface of the d-cover 1184 where the antenna cover extension section 1190 over laps with the d-cover 1184 or other chassis of the information handling system 1100 to secure the wireless charging system 1186 at the hole formed in the d-cover 1184 or other chassis.

As shown in FIG. 11, the stylus 1176 may include a RX charging coil 1156. The RX charging coil 1156 may receive a fluctuating magnetic field emitted from the antenna and/or charging coil 1156 of the twice-molded modular antenna operatively coupled to an NFC radio at the information handling system 1100. It is contemplated that the RX charging coil 1156 may similarly be an RX, antenna and/or charging coil 1156 formed via a twice molded process at an outer surface of stylus 1176 similar to the TX, twice-molded modular antenna in the base chassis side wall of an information handling system described according to the embodiments herein. The sidewall of the stylus 1176 may be made of metal with an antenna window into which a molded antenna or RX charging coil 1156 on a holder is molded into the window in the stylus sidewall. In this way, the RX charging coil 1156 may be closer to the surface of the stylus 1176 as well as closer to the TX charging coil antenna 1146 for more efficient and effective inductive wireless power transfer.

This fluctuating magnetic field is converted back into alternating current at the RX charging coil 1056 of the stylus 1076 and, in an embodiment, converted into DC via a rectifier and used to either power the stylus 1176 or charge a power storage device in the stylus 1176. This process of charging is initiated and controlled via operation of the wireless charging controller, for example. It is appreciated that, although FIG. 11 shows the stylus 1176 includes a RX charging coil 1156, other peripheral devices may also include a similar RX charging coil 1156 that interfaces in a similar way with the antenna and/or charging coil 1146 of the NFC radio. Therefore, in other embodiments, any of a wireless keyboard, a mouse, a headset, or other types of peripheral devices (e.g., any input/output device 112) may include a RX charging coil 1156 used to interface with the charging/communication coil of the NFC radio charging controller and PMU as described herein.

Figure 12:
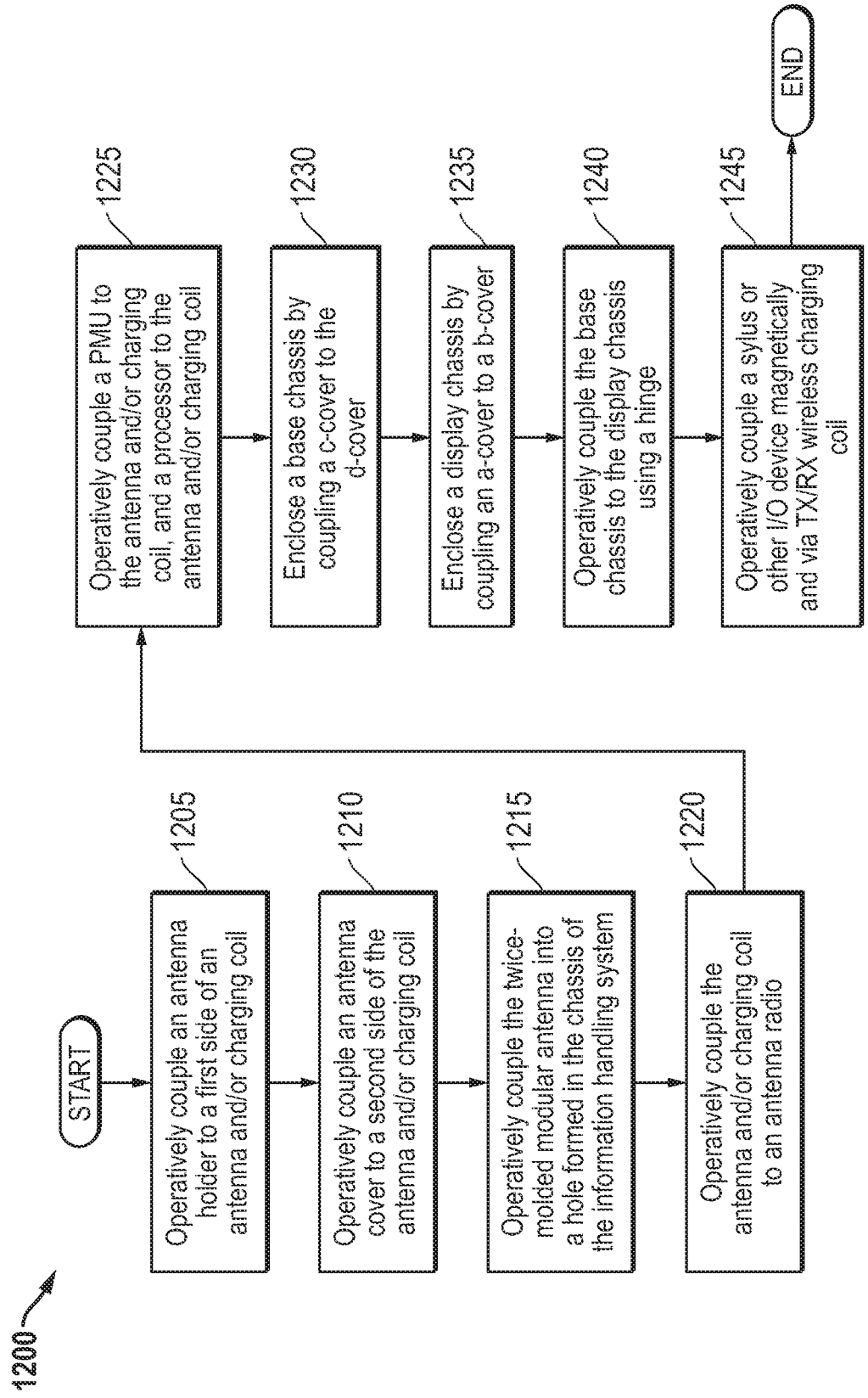
FIG. 12 is a flow diagram illustrating a method of manufacturing a wireless charging system or a transceiving antenna of an information handling system according to an embodiment of the present disclosure.

FIG. 12 is a flow diagram illustrating a method 1200 of manufacturing a wireless charging system of an information handling system according to an embodiment of the present disclosure. The method 700 may begin at block 1205 with operatively coupling an antenna holder to an antenna and/or charging coil. As described herein, this molding process may include an injection molding process where the antenna and/or charging coil is placed in a mold and a plastic is injected into this mold to form the antenna holder of the twice-molded modular antenna. This allows the plastic forming the antenna holder to conform to an inner surface (e.g., a first side) of the antenna and/or charging coil. The mold may, in an embodiment, secure the antenna and/or charging coil therein so that the shape of the antenna and/or charging coil may be maintained during this injection molding process. The shape of the mold may vary depending on the intended form of the antenna holder as well as the intended orientation of the antenna and/or charging coil in the twice-molded modular antenna.

The method 1200 may further include operatively coupling an antenna cover to a second side of the antenna and/or charging coil at block 1210. The antenna cover, in an embodiment, may be made of a plastic that is made to approximate the look, color, texture, or other characteristics of the chassis of the information handling system such as the d-cover. This is because the antenna cover is made to be the outer layer of the twice-molded modular antenna that is seen by a user. The type of plastic used may vary and may be selected so as to create an aesthetically pleasing look for the d-cover so as to not indicate or detract the user from seeing the location of the twice-molded modular antenna along the surface of the chassis. Alternatively, the selection of the plastic selected to form the antenna cover may be otherwise aesthetically pleasing regardless of whether a user can identify its location along the surface of the d-cover or not. In an embodiment, the plastic used to form the antenna cover is radio frequency (RF) transparent such that transception of an RF signal by the antenna and/or charging coil is not inhibited by the antenna cover. Similar to the formation of the antenna holder, in an embodiment, the antenna cover may be injection molded onto the antenna and/or charging coil using a mold. In an embodiment, this injection molding process may be conducted prior to or after the injection molding process has been completed to form the antenna holder as described herein.

In another embodiment, the injection molding process may include placing the antenna and/or charging coil in a mold and initiating the injection molding process associated with the plastic of the antenna holder and plastic of the antenna cover concurrently. In this embodiment, one or more alignment pins may be used to secure the antenna and/or charging coil in place and at a desired form to maintain an arrangement of the antenna and/or charging coil within the twice-molded modular antenna.

At block 1215, in an embodiment, the shape of the antenna cover, along with the antenna and/or charging coil and antenna holder molded with the antenna cover, may be such that the wireless charging system may injection molded directly into a hole formed in the metal chassis as an antenna window. In a second insert molding process, the antenna holder and antenna are insert molded into the antenna cover as the antenna cover is insert molded into a window formed in a window formed in a metallic chassis of the information handling system. In another embodiment, the modularity of the wireless charging system may allow the wireless charging system to form an interference fit with the d-cover so that the wireless charging system cannot be dislodged once placed within the hole.

Alternatively, or additionally, the wireless charging system and, in an embodiment, the antenna cover may include a number of interference ledges may be formed on the antenna cover or other piece of the wireless charging system such that an interference fit may be formed between the interference ledges and the d-cover of the information handling system or other chassis parts. In an embodiment, the pliability of the wireless charging system may be such that it can be elastically bent slightly and placed into the hole formed into the d-cover. In this embodiment, when the force used to bend the wireless charging system slightly is released, the antenna cover of the wireless charging system elastically returns to its original shape causing the antenna cover to be wedged against the d-cover at the interference ledges. Additionally, or alternatively, one or more holes or shafts may be formed into an antenna cover extension section and may interface mechanically at an interior surface of the d-cover where the antenna cover extension section over laps with the d-cover or other chassis of the information handling system to secure the wireless charging system at the hole formed in the d-cover or other chassis. As such, the injection molding processes at blocks 1205 and 1210 may be completed using customized molds so as to form these interference ledges, posts, or customize the shape and size of the twice-molded modular antenna to eventually be placed within the hole formed in the chassis to create this interference fit.

The method 1200 may further include operatively coupling the twice-molded modular antenna into a hole formed in the chassis of the information handling system at block 1215. As described herein, the size and shape of the twice-molded modular antenna may be customized at blocks 1205 and 1210 so that when the twice-molded modular antenna is placed within the hole, the twice-molded modular antenna forms an interference fit with the sides of the hole formed in the chassis. The location of the holes formed in the chassis may vary depending on a number of factors including the type of antenna used in the twice-molded modular antenna, the SAR ratings associated with those antenna systems, the location of the user relative to the antennas during use of the information handling system, internal space within the base chassis or display chassis, and the number of antenna systems used, among other factors.

The method 1200 may further include, at block 1220, with operatively coupling the antenna and/or charging coil to an antenna radio. The antenna radio, as described herein, may be any type of antenna radio such as a NFC radio, a WLAN radio, a WWAN radio, or the like. In an embodiment, multiple twice-molded modular antennas may be incorporated into the chassis of the information handling system and each coupled to one or more of these antenna radios.

The method may include, at block 1225, operatively coupling a PMU to the antenna and/or charging coil and a processor to the antenna and/or charging coil. The PMU and processor may be placed within the base chassis of the information handling system and provides power and processing resources, respectively, to the antenna and/or charging coil within the twice-molded modular antenna and the radio associated with the antenna and/or charging coil. This process may further include operatively coupling the antenna radio to the processor of the PMU to control the operations of the antenna and/or charging coil as described herein. Other processing devices such as a wireless charging controller used to execute, via an NFC radio, a charging process using the antenna and/or charging coil that interfaces with a RX charging coil within a peripheral device such as the stylus described herein.

The method 1200 includes enclosing a base chassis of the information handling system by coupling a c-cover to the d-cover at block 1230. As described herein, additional peripheral devices may be housed within the base chassis as well and the method 1200 here may include enclosing a CPU, GPU, memory, power systems/battery, wireless front end, a keyboard, trackpad, speakers, and other hardware devices within the base chassis.

The method 1200 may also include enclosing a display chassis by coupling an a-cover to a b-cover at block 1235. In an embodiment, the display chassis houses a display device and the a-cover and b-cover provide a level of protection for the display device from damage during operation.

The method 1200 may include, at block 1240, operatively coupling the base chassis to the display chassis using a hinge. As described herein, the information handling system may be a laptop-type information handling system that allows for the information handling system to be placed in a plurality of configurations such as the clamshell configuration and the tablet configuration as described herein. In an embodiment, this laptop-type information handling system may be a 360-degree information handling system that allows for the information handling system to be placed in the tablet configuration.

The method 1200 may optionally include, at block 1245, operatively coupling a stylus or other input/output device magnetically and via a TX/RX wireless charging coil. As described herein, the information handling system may include an TX charging coil that is used to wirelessly charge a power storage device (e.g., a battery) within an input/output device via a RX charging coil. Again, because of the shorter distances between the TX and RX charging coils in the information handling system and input/output device, respectively, the charging process may be more efficient. This is because of the smaller thickness of the antenna cover among other features of the twice-molded modular antenna described herein. At this point, the method 1200 may end.

The blocks of the flow diagrams of FIG. 12 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system with a wireless charging system, comprising:
   a processor;
   a memory;
   a power management unit (PMU);
   the wireless charging system including:
      a charging controller to control the wireless charging at a near field charging coil; and
      a twice-molded modular antenna including:
         the near field charging coil;
         an antenna holder onto which the near field charging coil is insert-molded; and
         an antenna cover that is molded onto the near field charging coil and into an antenna window of a chassis cover of the information handling system.

2. The information handling system of claim 1 further comprising:
   a stylus pen including a rechargeable battery and a receiving charging coil to receive a charge from the wireless charging system.

3. The information handling system of claim 1 further comprising:
   the antenna cover being made of a radiofrequency (RF) transparent material.

4. The information handling system of claim 1 further comprising:
   the antenna holder being made of plastic.

5. The information handling system of claim 1 further comprising:
   the antenna cover is made of plastic.

6. The information handling system of claim 1, wherein the antenna holder and antenna cover are injection molded to the near field charging coil within the antenna window in the chassis cover.

7. The information handling system of claim 1 further comprising:
a printed circuit board (PCB) operatively coupled to the near field charging coil and including the charging controller.

8. The information handling system of claim 1, wherein the twice-molded modular antenna of the wireless charging system is formed in the antenna window at an outer edge surface of the chassis cover of the information handling system.

9. A wireless charging system of an information handling system, comprising:
a twice-molded modular antenna including:
a power management unit (PMU);
a charging coil operatively coupled to the PMU;
an antenna holder onto which the charging coil is insert molded onto; and
an antenna cover that is molded onto the charging coil; and
the antenna cover is formed with interference joints used to interference fit into an antenna window of a chassis cover of the information handling system, wherein the antenna holder is insert molded onto a first side of the charging coil and the antenna cover is insert molded onto a second side of the charging coil.

10. The wireless charging system of claim 9 further comprising:
a wireless charging controller to control the wireless charging from the PMU, via the charging coil, of a rechargeable battery of a stylus pen at a receiving charging coil on the stylus pen.

11. The wireless charging system of claim 9 further comprising:
the antenna cover being made of a radio frequency (RF) transparent material.

12. The wireless charging system of claim 9, wherein the antenna holder and antenna cover are injection molded to the charging coil within a same mold.

13. The wireless charging system of claim 9, further comprising:
a printed circuit board (PCB) to which the charging coil and PMU are operatively coupled.

14. The wireless charging system of claim 9, wherein the twice-molded modular antenna of the wireless charging system is formed to place the charging coil in an antenna window at an edge surface of the chassis cover of the information handling system.

15. A communication system, comprising:
an antenna controller to provide instructions to a radio to cause an antenna to transceive wirelessly with a network via a wireless antenna in a twice-molded antenna structure, the twice-molded modular antenna structure including:
the wireless antenna to transceive with the network;
an antenna holder onto which the wireless antenna is insert molded; and
an antenna cover that is molded onto the wireless antenna;
wherein the antenna cover is formed to fill an antenna window in a chassis cover of an information handling system with the wireless antenna proximate to an outer surface of the antenna cover in the antenna window.

16. The communication system of claim 15 further comprising:
the antenna cover is injection molded to the wireless antenna and antenna holder and into the antenna window.

17. The communication system of claim 15 further comprising:
a printed circuit board (PCB) into which the antenna may be operatively coupled to prior to the antenna being insert molded onto the antenna holder.

18. The communication system of claim 15, wherein the antenna cover of the twice-molded modular antenna is interference fit into the antenna window at an edge surface of the chassis cover of the information handling system.

19. The communication system of claim 15 further comprising:
the antenna holder being made of plastic, wherein the antenna holder is insert molded onto the antenna placed within a mold.

20. The peripheral communication and charging system of claim 15 further comprising:
the antenna cover is made of a radiofrequency (RF) transparent material to fill the antenna window.

* * * * *